(12) United States Patent
Okamachi et al.

(10) Patent No.: US 11,927,254 B2
(45) Date of Patent: Mar. 12, 2024

(54) ROTARY DEVICE AND POWER TRANSMISSION DEVICE

(71) Applicant: EXEDY Corporation, Neyagawa (JP)

(72) Inventors: Yusuke Okamachi, Neyagawa (JP); Koichi Higuchi, Neyagawa (JP)

(73) Assignee: EXEDY Corporation, Osaka (JP)

( * ) Notice: Subject to any disclaimer, the term of this patent is extended or adjusted under 35 U.S.C. 154(b) by 437 days.

(21) Appl. No.: 17/340,367

(22) Filed: Jun. 7, 2021

(65) Prior Publication Data
US 2022/0010794 A1    Jan. 13, 2022

(30) Foreign Application Priority Data

| Jul. 7, 2020 | (JP) | ................................. 2020-117198 |
| Nov. 9, 2020 | (JP) | ................................. 2020-186708 |
| Jan. 19, 2021 | (JP) | ................................. 2021-006581 |

(51) Int. Cl.
| F16H 41/24 | (2006.01) |
| F16F 15/12 | (2006.01) |
| F16F 15/14 | (2006.01) |
| F16F 15/31 | (2006.01) |
| F16H 45/02 | (2006.01) |

(52) U.S. Cl.
CPC ......... *F16H 41/24* (2013.01); *F16F 15/1202* (2013.01); *F16F 15/14* (2013.01); *F16F 15/145* (2013.01); *F16F 15/31* (2013.01); *F16H 2045/0221* (2013.01); *Y10T 74/2128* (2015.01)

(58) Field of Classification Search
CPC .............. F16H 41/24; F16H 2045/0221; F16F 15/1202; F16F 15/14; F16F 15/145; F16F 15/31; Y10T 74/2128

USPC .............................. 74/474.2, 574.2; 464/68.2
See application file for complete search history.

(56) References Cited

U.S. PATENT DOCUMENTS

| RE20,773 | E | * | 6/1938 | Sarazin | .................... F16F 15/22 |
| | | | | | 74/574.3 |
| 11,156,277 | B2 | * | 10/2021 | Nishikawa | .............. F16H 45/02 |
| 2022/0260142 | A1 | * | 8/2022 | Tomita | ..................... F16H 45/02 |
| 2022/0260143 | A1 | * | 8/2022 | Tomita | ..................... F16H 45/02 |

FOREIGN PATENT DOCUMENTS

| JP | 2018-132161 A | 8/2018 |
| WO | WO 2018/150777 A1 * | 8/2018 |

* cited by examiner

*Primary Examiner* — Greg Binda
(74) *Attorney, Agent, or Firm* — United IP Counselors, LLC

(57) ABSTRACT

A rotary device includes a first rotor, a second rotor, a centrifugal element, and a first rolling member. The first rotor includes an accommodation portion having first and second guide surfaces. The first and second guide surfaces face both sides in a circumferential direction. The first rotor is disposed to be rotatable. The second rotor is disposed to be rotatable with and relative to the first rotor. The centrifugal element is disposed within the accommodation portion. The centrifugal element is disposed to be radially movable by a centrifugal force acting thereon in rotation of the first or second rotor. The centrifugal element rotates about a rotational axis thereof in radial movement thereof. The first rolling member is disposed between the first guide surface and the centrifugal element. The first rolling member rolls on the first guide surface in accordance with rotation of the centrifugal element about the rotational axis thereof.

22 Claims, 20 Drawing Sheets

ROTARY DEVICE AND POWER TRANSMISSION DEVICE

CROSS-REFERENCE TO RELATED APPLICATIONS

This application claims priority to Japanese Patent Application Nos. 2020-117198 filed Jul. 7, 2020, 2020-186708 filed Nov. 9, 2020, and 2021-006581 filed Jan. 19, 2021. The entire contents of those applications are incorporated by reference herein in their entireties.

TECHNICAL FIELD

The present invention relates to a rotary device and a power transmission device.

BACKGROUND ART

There has been known a type of rotary device in which centrifugal elements are attached to a rotor rotated about a rotational axis. The rotary device exerts a function when a centrifugal force acts on each centrifugal element in rotation of the rotor. The rotary device described above is exemplified by a torque fluctuation inhibiting device.

The torque fluctuation inhibiting device includes an input member and an inertia member. For example, in a torque fluctuation inhibiting device described in Japan Laid-open Patent Application Publication No. 2018-132161, centrifugal elements are disposed in recessed portions of a hub flange, respectively, while being radially movable therein. Each centrifugal element is moved radially outward within each recessed portion by a centrifugal force acting thereon in rotation of the hub flange. Besides, each centrifugal element includes rollers so as to be radially movable in a smooth manner. The rollers of each centrifugal element roll on the inner wall surfaces (guide surfaces) of each recessed portion.

From the perspective of manufacturing accuracy, it is difficult for the torque fluctuation inhibiting device described above to eliminate the clearance between each centrifugal element and each guide surface. Because of this, a gap is produced between each centrifugal element and each guide surface. The existence of the gap results in a drawback that contact sound is produced between each centrifugal element and each inner wall surface when torque fluctuations change in direction from positive to negative.

BRIEF SUMMARY

In view of the above, it is an object of the present invention to inhibit contact sound from being produced between a centrifugal element and a guide surface.

A rotary device according to a first aspect of the present invention includes a first rotor, a second rotor, a centrifugal element, and a first rolling member. The first rotor includes an accommodation portion having a first guide surface and a second guide surface. The first and second guide surfaces face both sides in a circumferential direction. The first rotor is disposed to be rotatable. The second rotor is disposed to be rotatable with the first rotor and be rotatable relative to the first rotor. The centrifugal element is disposed within the accommodation portion. The centrifugal element is disposed to be radially movable by a centrifugal force acting thereon in rotation of the first or second rotor. The centrifugal element is configured to rotate about a rotational axis thereof in radial movement thereof. The first rolling member is disposed between the first guide surface and the centrifugal element. The first rolling member is configured to roll on the first guide surface in accordance with rotation of the centrifugal element about the rotational axis thereof.

According to this configuration, the first rolling member is disposed between the centrifugal element and the first guide surface. A gap between the centrifugal element and the first guide surface can be filled with the first rolling member. As a result, contact sound can be inhibited from being produced between the centrifugal element and the first guide surface. It should be noted that the term "rotation of the centrifugal element about the rotational axis thereof" is conceptualized as encompassing not only rotation of the entirety of the centrifugal element about the rotational axis thereof but also rotation of part of members composing the centrifugal element about the rotational axis thereof.

Preferably, the centrifugal element is configured to roll on the second guide surface.

Preferably, the centrifugal element and the first rolling member are each made in shape of a hollow or solid cylinder. A distance between the first guide surface and the second guide surface is less than a sum of a diameter of the centrifugal element and a diameter of the first rolling member.

Preferably, the rotary device further includes a second rolling member. The second rolling member is disposed between the second guide surface and the centrifugal element. The second rolling member rolls on the second guide surface in accordance with the rotation of the centrifugal element about the rotational axis thereof.

Preferably, the centrifugal element includes a centrifugal element body, a first rotary part, and a second rotary part. The centrifugal element body includes a first end portion and a second end portion in the circumferential direction. The first rotary part is attached to be rotatable to the first end portion of the centrifugal element body. The second rotary part is attached to be rotatable to the second end portion of the centrifugal element body. The first rolling member is disposed between the first guide surface and the first rotary part. The first rolling member rolls on the first guide surface in accordance with rotation of the first rotary part about a rotational axis thereof. The second rolling member is disposed between the second guide surface and the second rotary part. The second rolling member rolls on the second guide surface in accordance with rotation of the second rotary part about a rotational axis thereof.

Preferably, the rotary device further includes a cam mechanism. The cam mechanism receives the centrifugal force acting on the centrifugal element and converts the centrifugal force into a circumferential force directed to reduce rotational phase difference between the first rotor and the second rotor. The cam mechanism includes a cam surface and a cam follower. The cam surface is provided on the centrifugal element. The cam follower makes contact with the cam surface. The cam follower transmits a force therethrough between the centrifugal element and the second rotor.

Preferably, the cam follower rolls on the cam surface.

Preferably, the centrifugal element includes a first through hole axially penetrating therethrough. The cam surface is provided as part of an inner wall surface of the first through hole.

Preferably, the cam follower is attached to the second rotor while being rotatable about a rotational axis thereof.

Preferably, the second rotor includes a second through hole. The cam follower rolls on an inner wall surface of the second through hole.

Preferably, the cam follower is a roller made in shape of a solid or hollow cylinder.

Preferably, the rotary device further includes a cam follower made in shape of a solid or hollow cylinder. The centrifugal element includes a first through hole axially extending. The second rotor includes a second through hole axially extending. The first through hole includes a cam surface provided as part of an inner wall surface thereof. The cam surface faces radially outward and makes contact with the cam follower. The second through hole includes a contact surface provided as part of an inner wall surface thereof. The contact surface faces radially inward and makes contact with the cam follower. The cam surface includes a first region and a second region. The first region makes contact with the cam follower when the centrifugal element rolls on the first guide surface through the first rolling member. The second region makes contact with the cam follower when the centrifugal element rolls on the second guide surface. The first region is different in curved surface shape from the second region.

Preferably, the first region is less in curvature radius than the second region.

Preferably, the contact surface includes a third region and a fourth region. The third region makes contact with the cam follower when the centrifugal element rolls on the first guide surface through the first rolling member. The fourth region makes contact with the cam follower when the centrifugal element rolls on the second guide surface. The third region is different in curved surface shape from the fourth region.

Preferably, the rotary device further includes a cam follower made in shape of a solid or hollow cylinder. The centrifugal element includes a first through hole axially extending. The second rotor include a second through hole axially extending. The first through hole includes a cam surface provided as part of an inner wall surface thereof. The cam surface faces radially outward and makes contact with the cam follower. The second through hole includes a contact surface provided as part of an inner wall surface thereof. The contact surface faces radially inward and makes contact with the cam follower. The contact surface includes a third region and a fourth region. The third region makes contact with the cam follower when the centrifugal element rolls on the first guide surface through the first rolling member. The fourth region makes contact with the cam follower when the centrifugal element rolls on the second guide surface. The third region is different in curved surface shape from the fourth region.

Preferably, the third region is greater in curvature radius than the fourth region.

Preferably, the rotary device further includes a state maintaining mechanism. The state maintaining mechanism is configured to maintain a state of the centrifugal element such that a boundary between the first region and the second region makes contact with the cam follower when the first rotor and the second rotor are unitarily rotated with each other without being rotated relative to each other.

Preferably, the state maintaining mechanism includes a first engaging portion and a second engaging portion. The first engaging portion is provided on the first rotor. The second engaging portion is provided on the centrifugal element to be engaged with the first engaging portion.

Preferably, the second rotor includes a restriction groove. The first rolling member is supported by the restriction groove.

Preferably, the accommodation portion includes a bottom surface and a connecting surface. The bottom surface faces radially outward. The connecting surface connects the first guide surface and the bottom surface therethrough.

The connecting surface can be made in shape of a curved surface, or alternatively, can be made in shape of a flat surface.

A power transmission device according to a second aspect of the present invention includes an input member, an output member, to which a torque is transmitted from the input member, and the rotary device configured as any of the above.

Overall, according to the present invention, contact sound can be inhibited from being produced between a centrifugal element and a guide surface.

DETAILED DESCRIPTION

Figure 1:
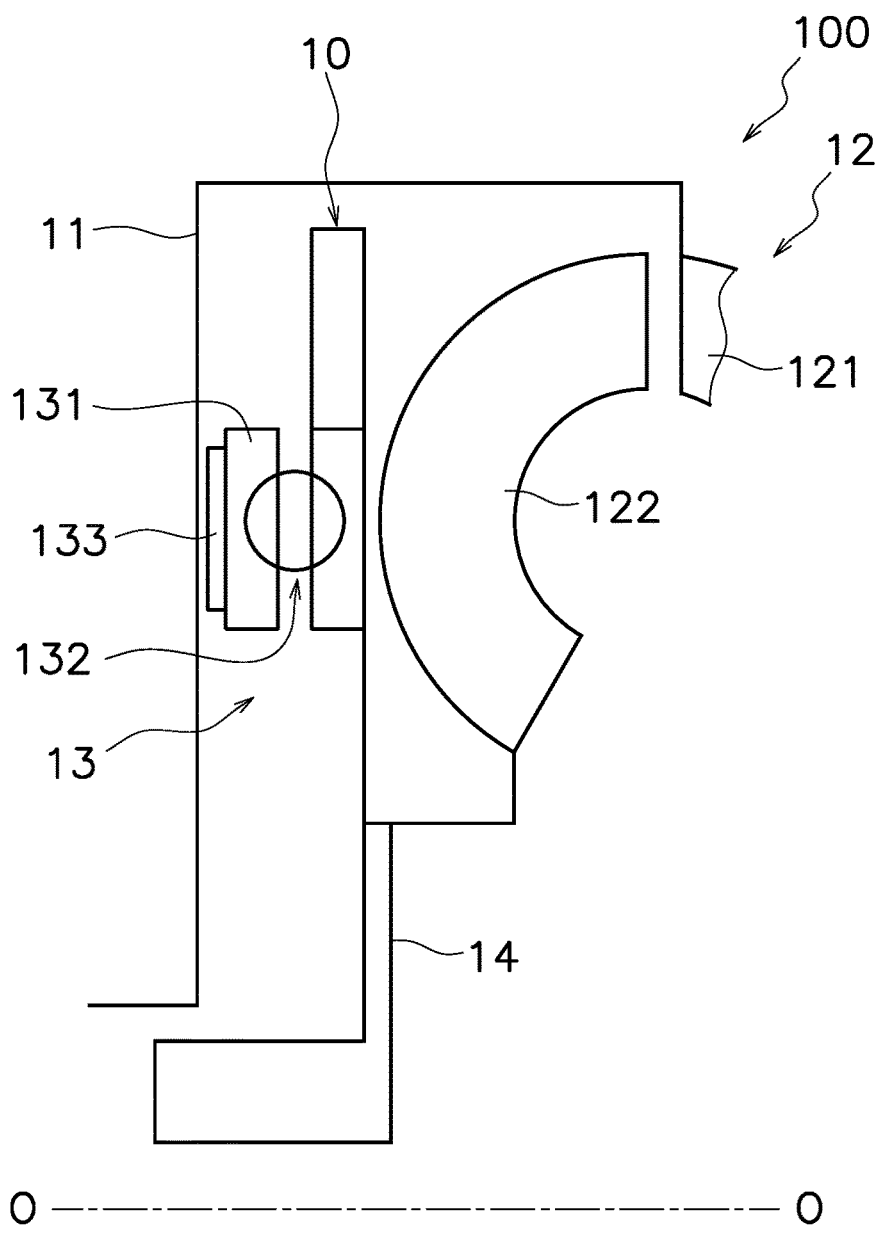
FIG. 1 is a schematic diagram of a torque converter.

A torque fluctuation inhibiting device (exemplary rotary device) and a torque converter (exemplary power transmission device) according to a preferred embodiment will be hereinafter explained with reference to drawings. FIG. 1 is a schematic diagram of a torque converter. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a centrifugal element in FIG. 4. Likewise, the radial direction is not required to be perfectly matched with a diameter direction of the imaginary circle about the rotational axis O, and is conceptualized as encompassing, for instance, an up-and-down direction defined based on the centrifugal element in FIG. 4.

Entire Configuration

As shown in FIG. 1, a torque converter 100 includes a front cover 11, a torque converter body 12, a lock-up device 13, and an output hub 14 (exemplary output member). The front cover 11 is a member to which a torque is inputted from an engine. The torque converter body 12 includes an impeller 121 coupled to the front cover 11, a turbine 122, and a stator (not shown in the drawings). The turbine 122 is coupled to the output hub 14. An input shaft of a transmission (not shown in the drawings) is spline-coupled to the output hub 14.

Lock-Up Device 13

The lock-up device 13 includes components such as a clutch part and a piston to be actuated by hydraulic pressure or so forth and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131 (exemplary input member), a damper 132, and a torque fluctuation inhibiting device 10.

The input-side rotor 131 includes a piston movable in the axial direction and a friction member 133 fixed to the front cover 11-side lateral surface thereof. When the friction member 133 is pressed against the front cover 11, the torque is transmitted from the front cover 11 to the input-side rotor 131.

The damper 132 is disposed between the input-side rotor 131 and a hub flange 2 (to be described). The damper 132 includes a plurality of torsion springs and elastically couples the input-side rotor 131 and the hub flange 2 in the circumferential direction. The damper 132 transmits the torque from the input-side rotor 131 to the hub flange 2 therethrough, and besides, absorbs and attenuates torque fluctuations.

Torque Fluctuation Inhibiting Device 10

Figure 2:
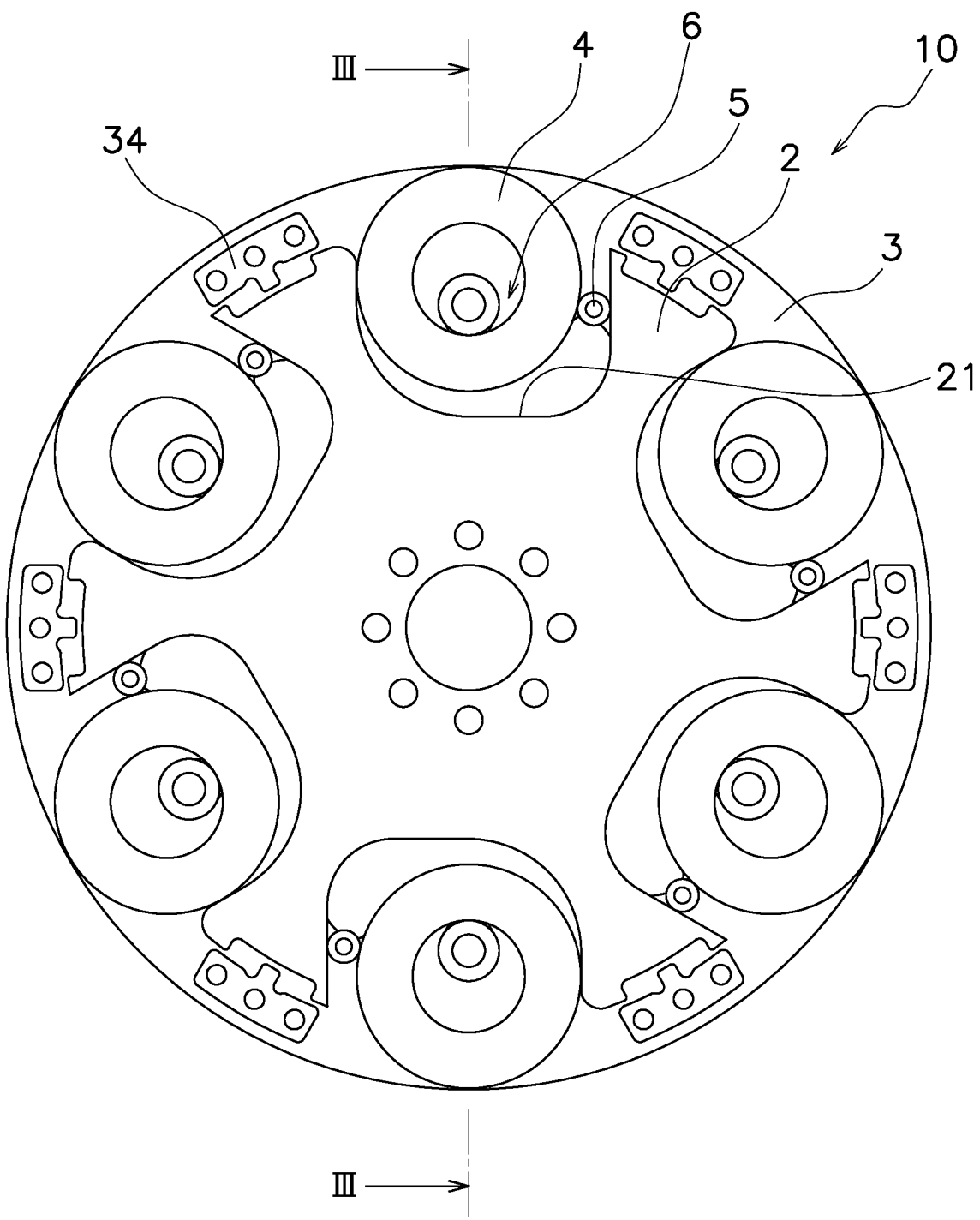
FIG. 2 is a front view of a torque fluctuation inhibiting device in a condition that one of inertia rings is detached therefrom.
Figure 3:
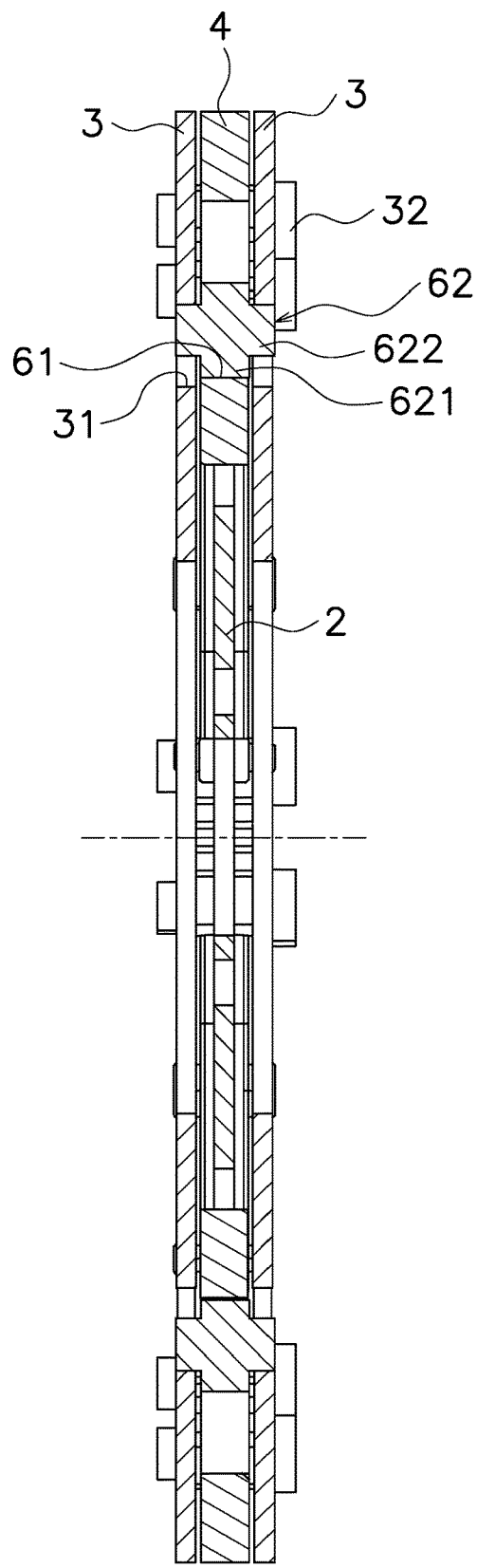
FIG. 3 is a cross-sectional view of FIG. 2 taken along line III-III.

FIG. 2 is a front view of the torque fluctuation inhibiting device 10, whereas FIG. 3 is a cross-sectional view of FIG. 2 taken along line III-III. It should be noted that in FIG. 2, one of a pair of inertia rings 3 (near-side inertia ring 3) is detached.

As shown in FIGS. 2 and 3, the torque fluctuation inhibiting device 10 includes the hub flange 2 (exemplary first rotor), the pair of inertia rings 3 (exemplary second rotor), centrifugal elements 4, first rolling members 5, and cam mechanisms 6.

Hub Flange 2

The hub flange 2 is disposed to be rotatable. The hub flange 2 is disposed in axial opposition to the input-side rotor 131. The hub flange 2 is rotatable relative to the input-side rotor 131. The hub flange 2 is coupled to the output hub 14. In other words, the hub flange 2 is unitarily rotated with the output hub 14. It should be noted that the hub flange 2 can be integrated with the output hub 14 as a single member.

The hub flange 2 has an annular shape. The hub flange 2 is coupled at the inner peripheral part thereof to the output hub 14. The hub flange 2 is provided with a plurality of accommodation portions 21. In the present preferred embodiment, the hub flange 2 includes six accommodation portions 21. The plural accommodation portions 21 are disposed apart from each other at intervals in the circumferential direction. The accommodation portions 21 are provided in the outer peripheral part of the hub flange 2. Each accommodation portion 21 is opened radially outward. Each accommodation portion 21 has a predetermined depth.

Figure 4:
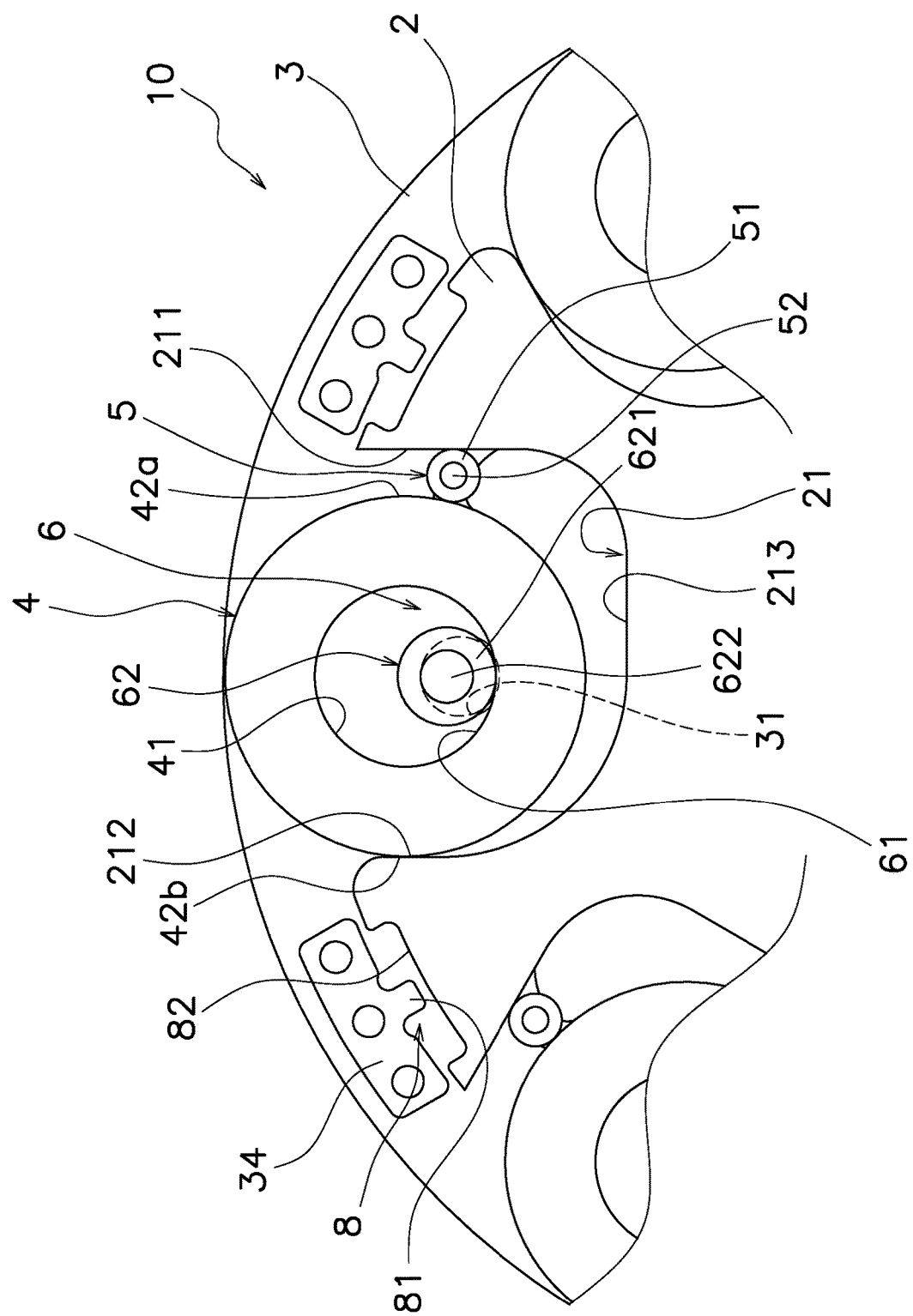
FIG. 4 is an enlarged front view of the torque fluctuation inhibiting device.

FIG. 4 is an enlarged view of the torque fluctuation inhibiting device 10. As shown in FIG. 4, an inner wall surface, by which each accommodation portion 21 is delimited, includes a first guide surface 211, a second guide surface 212, and a bottom surface 213.

The first and second guide surfaces 211 and 212 face both sides in the circumferential direction (right-and-left direction in FIG. 4). The first and second guide surfaces 211 and 212 face each centrifugal element 4. Without installation of each centrifugal element 4, the first and second guide surfaces 211 and 212 are opposed to each other. The first and second guide surfaces 211 and 212 extend approximately in parallel to each other. The first and second guide surfaces 211 and 212 are each made in the shape of a flat surface.

The bottom surface 213 connects the first guide surface 211 and the second guide surface 212 therethrough. The bottom surface 213 has an approximately circular-arc shape as seen in the front (i.e., axial) view. The bottom surface 213 faces radially outward. The bottom surface 213 is opposed to the outer peripheral surface of each centrifugal element 4.

Inertia Rings 3

Figure 5:
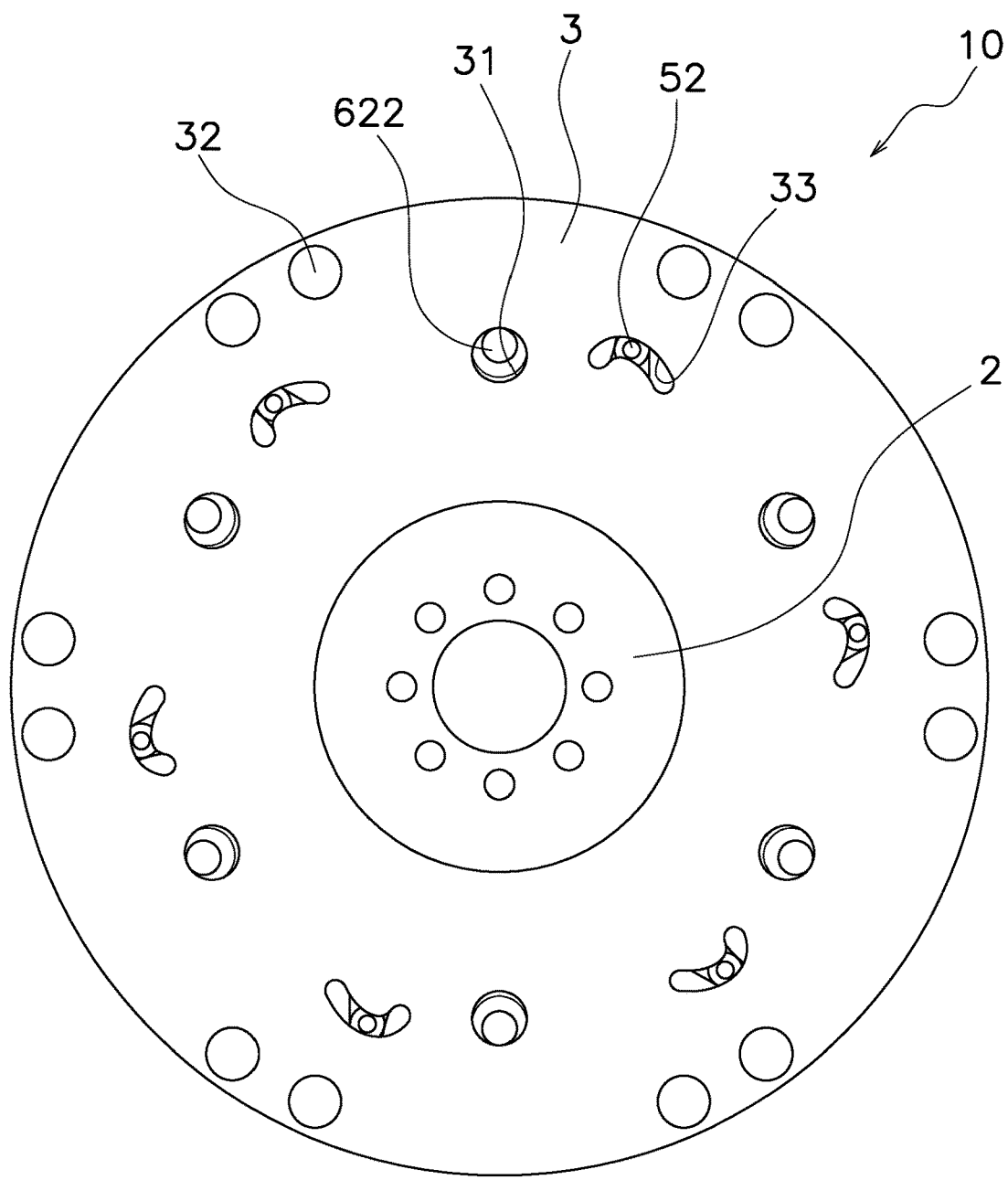
FIG. 5 is a front view of the torque fluctuation inhibiting device.

As shown in FIGS. 3 and 5, each inertia ring 3 is an annular plate. When described in detail, each inertia ring 3 is made in the shape of a continuous annulus. The pair of inertia rings 3 functions as a mass body of the torque fluctuation inhibiting device 10.

The pair of inertia rings 3 is disposed to axially interpose the hub flange 2 therebetween. The pair of inertia rings 3 is disposed axially on both sides of the hub flange 2 such that a predetermined gap is produced between the hub flange 2 and each inertia ring 3. In other words, the hub flange 2 and the pair of inertia rings 3 are disposed in axial alignment. The pair of inertia rings 3 has a rotational axis common to the hub flange 2. The pair of inertia rings 3 is rotatable with the hub flange 2 and is also rotatable relative to the hub flange 2.

Each inertia ring 3 includes a plurality of second through holes 31. The second through holes 31 extend in the axial direction. The second through holes 31 penetrate each inertia ring 3 in the axial direction. Each second through hole 31 is greater in diameter than each of a pair of small diameter portions 622 of each cam follower 62 (to be described). Besides, each second through hole 31 is less in diameter than a large diameter portion 621 of each cam follower 62.

The pair of inertia rings 3 is fixed to each other by a plurality of rivets 32. Therefore, the pair of inertia rings 3 is axially, radially, and circumferentially immovable relative to each other. In other words, the pair of inertia rings 3 is unitarily rotated with each other.

Each inertia ring 3 is provided with a plurality of restriction grooves 33. The plural restriction grooves 33 provided in one inertia ring 3 are identical in shape and position to those provided in the other inertia ring 3. Each restriction groove 33 is made in the shape of a circular arc protruding radially outward.

As shown in FIG. 2, a plurality of inertia blocks 34 are disposed between the pair of inertia rings 3. The plural inertia blocks 34 are disposed apart from each other at intervals in the circumferential direction. For example, the inertia blocks 34 and the centrifugal elements 4 are alternately disposed in the circumferential direction. The inertia blocks 34 are fixed to the pair of inertia rings 3. Specifically, the inertia blocks 34 are fixed to the pair of inertia rings 3 by the rivets 32. It should be noted that each inertia block 34 is greater in thickness than each centrifugal element 4.

Centrifugal Elements 4

Each centrifugal element 4 is disposed within each accommodation portion 21. Each centrifugal element 4 is configured to receive a centrifugal force generated by rotation of the hub flange 2. Each centrifugal element 4 is radially movable within each accommodation portion 21. It should be noted that each centrifugal element 4 is configured to rotate about a rotational axis thereof in radial movement. In the present preferred embodiment, each centrifugal element 4 entirely rotates about the rotational axis thereof. Each centrifugal element 4 is restricted from axially moving by the pair of inertia rings 3.

As shown in FIG. 4, each centrifugal element 4 is made in the shape of a disc and includes a first through hole 41 in the middle part thereof. In other words, each centrifugal element 4 is made in the shape of a tubular or hollow cylinder. Each centrifugal element 4 is greater in thickness than that the hub flange 2. Each centrifugal element 4 can be provided as a single member.

Each centrifugal element 4 makes contact with the second guide surface 212 and each first rolling member 5. Because of this, each centrifugal element 4 is restricted from circumferentially moving. On the other hand, each centrifugal element 4 is radially movable. Each centrifugal element 4 rolls on the second guide surface 212 of each accommodation portion 21 in radial movement. Besides, each centrifugal element 4 rolls on the first guide surface 211 through each first rolling member 5 in radial movement. In other words, each centrifugal element 4 rolls on the outer peripheral surface of each first rolling member 5.

When rolling, each centrifugal element 4 rolls in contact at one part of the outer peripheral surface thereof with the outer peripheral surface of each first rolling member 5. This part is defined as a first contact surface 42a. Also, when rolling, each centrifugal element 4 rolls in contact at another part of the outer peripheral surface thereof with the second guide surface 212. This part is defined as a second contact surface 42b. The first and second contact surfaces 42a and 42b each have a circular-arc shape as seen in the axial view.

The first through hole 41 extends in the axial direction. The first through hole 41 penetrates each centrifugal element 4 in the axial direction. The first through hole 41 is greater in diameter than each cam follower 62. When described in detail, the first through hole 41 is greater in diameter than the large diameter portion 621 of each cam follower 62. The inner wall surface of each centrifugal element 4, by which the first through hole 41 is delimited, is provided in part as a cam surface 61.

First Rolling Members 5

Each first rolling member 5 is disposed between the first guide surface 211 and each centrifugal element 4. When described in detail, each first rolling member 5 is interposed between the first guide surface 211 and each centrifugal element 4. Each first rolling member 5 makes contact with the first guide surface 211 and each centrifugal element 4.

The center of each first rolling member 5 is located radially inside that of each centrifugal element 4. Each first rolling member 5 is provided as a roller made in the shape of a column or solid cylinder. In other words, each first rolling member 5 is not a bearing.

Each first rolling member 5 includes a large diameter portion 51 and a pair of small diameter portions 52. The center of the large diameter portion 51 is matched with that of each small diameter portion 52. The diameter of the large diameter portion 51 is greater than that of each small diameter portion 52. The diameter of the large diameter portion 51 is greater than the width of each restriction groove 33. Because of this, each first rolling member 5 is axially supported by the pair of inertia rings 3.

The pair of small diameter portions 52 protrudes from the large diameter portion 51 to both sides in the axial direction. The diameter of each small diameter portion 52 is less than the width of each restriction groove 33. Each small diameter portion 52 is disposed within each restriction groove 33 of each inertia ring 3. A predetermined gap is produced between each small diameter portion 52 and the inner wall surface of each restriction groove 33, whereby each small diameter portion 52 is smoothly movable within each restriction groove 33. Thus, each small diameter portion 52 is disposed within each restriction groove 33, whereby each first rolling member 5 can be restricted from radially moving in stop of the torque fluctuation inhibiting device 10. In other words, each first rolling member 5 is supported by each restriction groove 33.

Each first rolling member 5 can be provided as a single member. In other words, the large diameter portion 51 and the pair of small diameter portions 52 in each first rolling member 5 are provided as a single member. It should be noted that each first rolling member 5 can be made in the shape of a column or solid cylinder with a constant diameter. Alternatively, each first rolling member 5 can be made in the shape of a tube or hollow cylinder.

Each first rolling member 5 is configured to roll on the first guide surface 211 in accordance with rotation of each centrifugal element 4 about the rotational axis thereof. In other words, when each centrifugal element 4 rotates about the rotational axis thereof, each first rolling member 5 also rotates about a rotational axis thereof. It should be noted that each centrifugal element 4 and each first rolling member 5 rotate in opposite directions. Besides, each first rolling member 5 rolls on the first guide surface 211 by rotating about the rotational axis thereof. When described in detail, the large diameter portion 51 of each first rolling member 5 rolls on the first guide surface 211.

When rotation-directional phase difference (i.e., rotational phase difference) is not produced between the hub flange 2 and the pair of inertia rings 3, each small diameter portion 52 is located in approximately the lengthwise (i.e., circumferential) middle of each restriction groove 33 as shown in FIG. 5. When the rotational phase difference is then produced between the hub flange 2 and the pair of inertia rings 3, each small diameter portion 52 is moved along each restriction groove 33.

Figure 6:
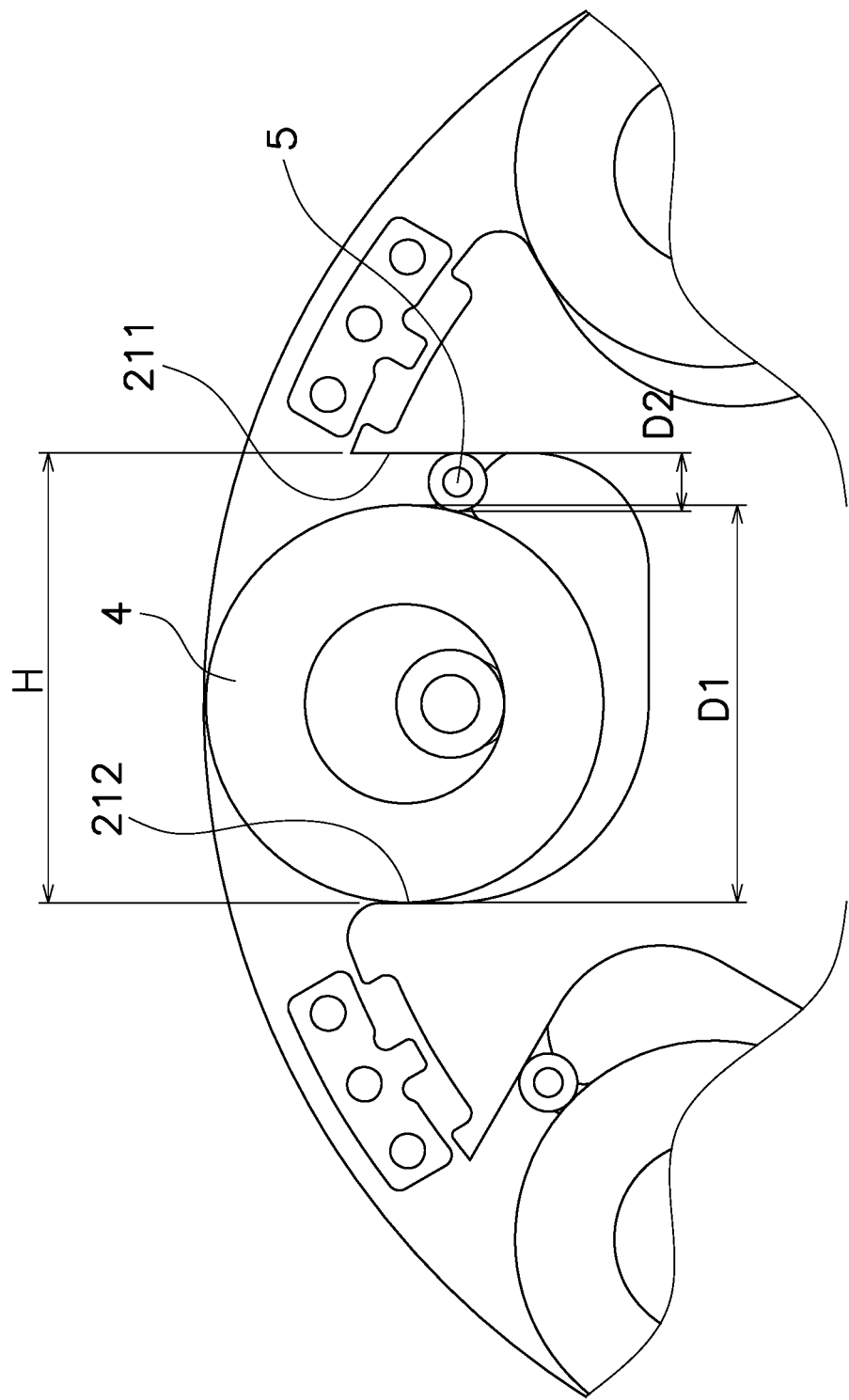
FIG. 6 is an enlarged front view of the torque fluctuation inhibiting device.

As shown in FIG. 6, a distance (H) between the first guide surface 211 and the second guide surface 212 is less than the sum of the diameter (D1) of each centrifugal element 4 and the diameter (D2) of each first rolling member 5. In other words, the relation "H<D1+D2" is established. Accordingly, during actuation of the torque fluctuation inhibiting device 10, each centrifugal element 4 constantly makes contact with the second guide surface 212 and each first rolling member 5.

The diameter (D2) of each first rolling member 5 is greater than a gap between the first guide surface 211 and the outer peripheral surface of each centrifugal element 4. Hence, each first rolling member 5 is restricted from jumping out radially outward.

Cam Mechanisms 6

As shown in FIG. 4, each cam mechanism 6 is configured to receive a centrifugal force acting on each centrifugal element 4 and convert the centrifugal force into a circumferential force directed to reduce the rotational phase difference between the hub flange 2 and the pair of inertia rings 3. It should be noted that each cam mechanism 6 functions when the rotational phase difference is produced between the hub flange 2 and the pair of inertia rings 3.

Each cam mechanism 6 includes the cam surface 61 and the cam follower 62. The cam surface 61 is provided on each centrifugal element 4. When described in detail, the cam surface 61 is part of the inner wall surface of the first through hole 41 of each centrifugal element 4. The cam surface 61 is a surface with which the cam follower 62 makes contact. The cam surface 61 has a circular-arc shape as seen in the axial view. The cam surface 61 faces radially outward.

The cam follower 62 makes contact with the cam surface 61. The cam follower 62 is configured to transmit a force therethrough between each centrifugal element 4 and the pair of inertia rings 3. When described in detail, the cam follower 62 extends inside both the first through hole 41 and each pair of second through holes 31 of the pair of inertia rings 3. The cam follower 62 is attached to the pair of inertia rings 3, while being rotatable about a rotational axis thereof.

The cam follower 62 rolls on the cam surface 61 of the first through hole 41. Besides, the cam follower 62 rolls on the inner wall surfaces of each pair of second through holes 31 of the pair of inertia rings 3. It should be noted that the cam follower 62 makes contact with a region (i.e., a region facing radially inward) of the inner wall surface of each second through hole 31 of each pair. In other words, the cam follower 62 is interposed between the cam surface 61 and the inner wall surface of each second through hole 31 of each pair.

When described in detail, the cam follower 62 makes contact with the cam surface 61 on the radially inner side, while making contact with the inner wall surface of each second through hole 31 of each pair on the radially outer side. This results in positioning of the cam follower 62. Moreover, the cam follower 62 transmits a force therethrough between each centrifugal element 4 and the pair of inertia rings 3 due to the configuration that the cam follower 62 is interposed between the cam surface 61 and the inner wall surface of each second through hole 31 of each pair.

The cam follower 62 is provided as a roller made in the shape of a column or solid cylinder. In other words, the cam follower 62 is not a bearing. The cam follower 62 includes the large diameter portion 621 and the pair of small diameter portions 622. The center of the large diameter portion 621 is matched with that of each small diameter portion 622. The large diameter portion 621 is greater in diameter than each small diameter portion 622. The large diameter portion 621 is less in diameter than the first through hole 41 but is greater in diameter than each second through hole 31. The large diameter portion 621 rolls on the cam surface 61.

The pair of small diameter portions 622 axially protrudes to both sides from the large diameter portion 621. Each small diameter portion 622 of each pair rolls on the inner wall surface of each second through hole 31 of each pair. Each small diameter portion 622 is less in diameter than each second through hole 31. The cam follower 62 can be provided as a single member. In other words, the large diameter portion 621 and the pair of small diameter portions 622 in the cam follower 62 are provided as a single member. It should be noted that the cam follower 62 can be made in the shape of a column or solid cylinder with a constant diameter. Alternatively, the cam follower 62 can be made in the shape of a tube or hollow cylinder.

When the rotational phase difference is produced between the hub flange 2 and the pair of inertia rings 3 by the contact between the cam follower 62 and the cam surface 61 and the contact between the cam follower 62 and the inner wall surface of each second through hole 31 of each pair, the centrifugal force generated in each centrifugal element 4 is converted into the circumferential force by which the rotational phase difference is reduced.

Stopper Mechanisms 8

The torque fluctuation inhibiting device 10 further includes stopper mechanisms 8. The stopper mechanisms 8 restrict relative rotation between the hub flange 2 and the pair of inertia rings 3 to a predetermined angular range. Each stopper mechanism 8 includes a protrusion 81 and a recess 82.

The protrusion 81 protrudes radially inward from each inertia block 34. The recess 82 is provided on the outer peripheral surface of the hub flange 2. The protrusion 81 is disposed within the recess 82. The relative rotation between the hub flange 2 and the pair of inertia rings 3 is restricted to the predetermined angular range by the contact of the protrusion 81 with each of the end surfaces of the recess 82.

Actuation of Torque Fluctuation Inhibiting Device 10

Actuation of the torque fluctuation inhibiting device 10 will be explained with FIGS. 7 and 8.

In the lock-up on state, a torque transmitted to the front cover 11 is transmitted to the hub flange 2 through the input-side rotor 131 and the damper 132.

Figure 7:
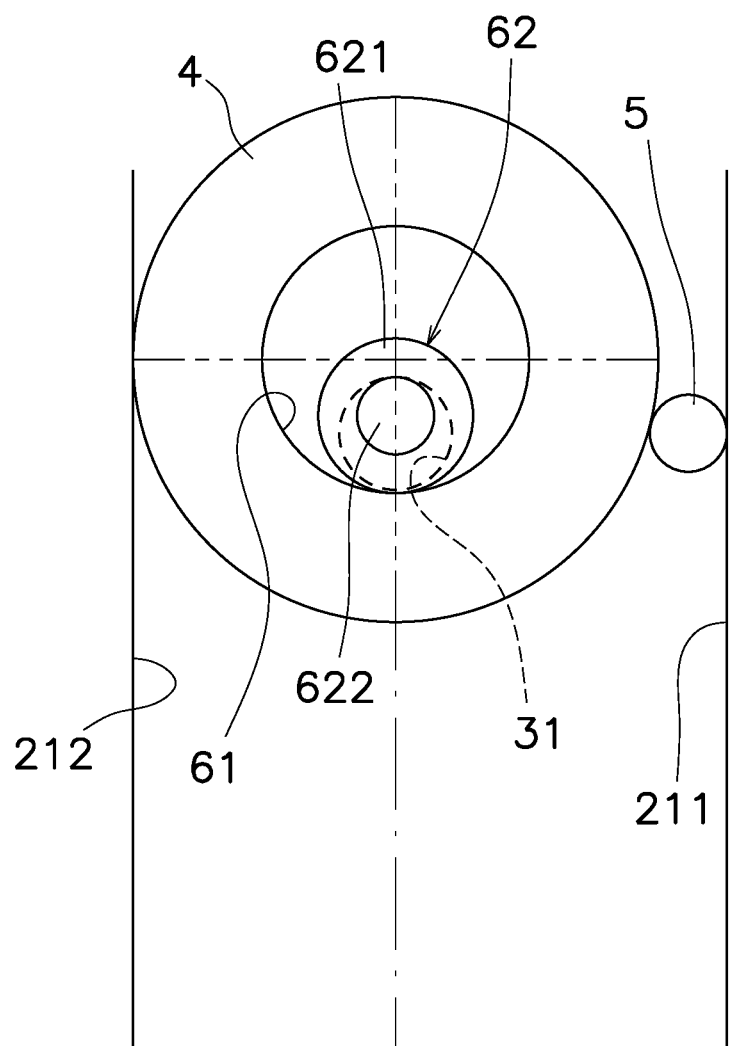
FIG. 7 is a diagram roughly showing a positional relation among a centrifugal element, a cam follower, the inertia rings, and a first rolling member in a condition without input of torque fluctuations.

When torque fluctuations do not exist in torque transmission, the hub flange 2 and the pair of inertia rings 3 are rotated in a condition shown in FIG. 7. In this condition, the cam follower 62 in each cam mechanism 6 makes contact with a radial innermost position (circumferential middle position) of the cam surface 61. Besides, in this condition, the rotational phase difference between the hub flange 2 and the pair of inertia rings 3 is "0".

As described above, the circumferential relative displacement between the hub flange 2 and the pair of inertia rings 3 is referred to as "rotational phase difference". In FIGS. 7 and 8, these terms indicate displacement between the circumferential middle position of both each centrifugal element 4 and the cam surface 61 thereof and the center position of each second through hole 31.

Figure 8:
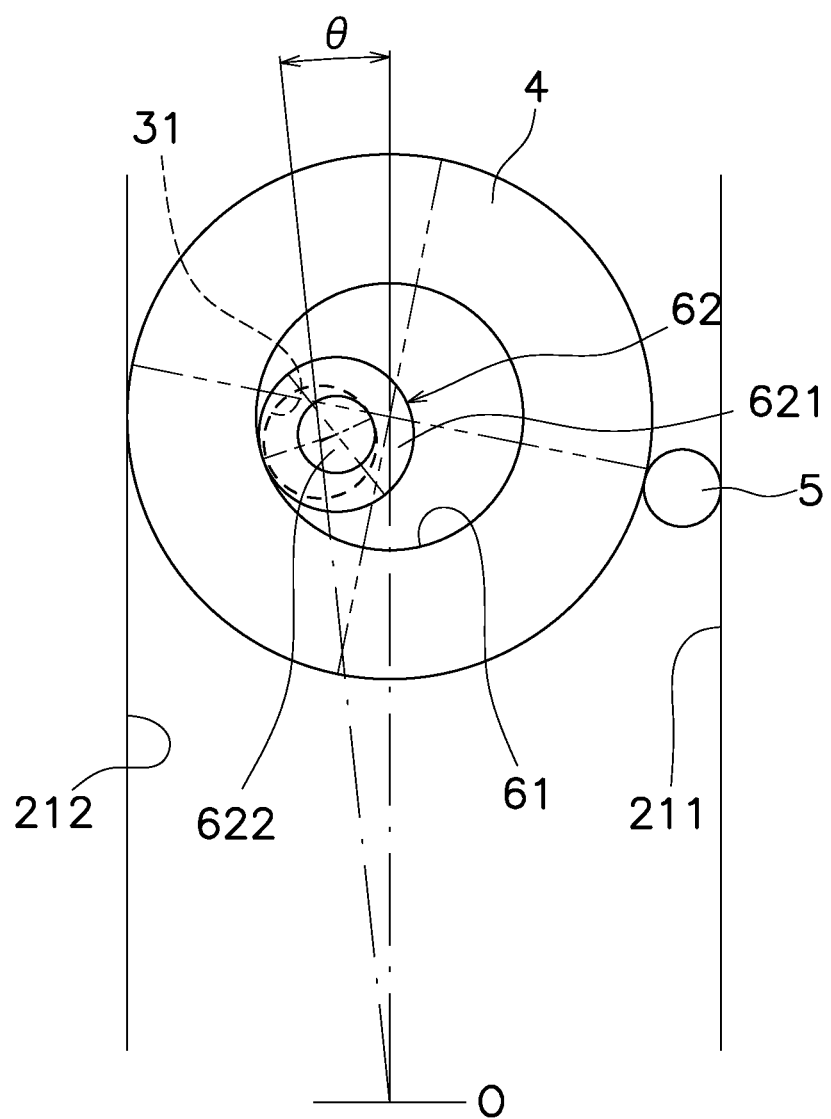
FIG. 8 is a diagram roughly showing a positional relation among the centrifugal element, the cam follower, the inertia rings, and the first rolling member in a condition with input of torque fluctuations.

When torque fluctuations herein exist in torque transmission, rotational phase difference θ is produced between the hub flange 2 and the pair of inertia ring 3 as shown in FIG. 8.

As shown in FIG. 8, when the rotational phase difference θ is produced between the hub flange 2 and the pair of inertia rings 3, the cam follower 62 in each cam mechanism 6 is moved from a position shown in FIG. 7 to a position shown in FIG. 8. At this time, the cam follower 62 is relatively moved to the left side while rolling on the cam surface 61. Besides, the cam follower 62 also rolls on the inner wall surfaces of each pair of second through holes 31 of the pair of inertia rings 3. When described in detail, the large diameter portion 621 of the cam follower 62 rolls on the cam surface 61, whereas each small diameter portion 622 of the cam follower 62 rolls on the inner wall surface of each second through hole 31 of each pair. It should be noted that the cam follower 62 is rotated counterclockwise about the rotational axis thereof.

When moved to the left side, the cam follower 62 presses the centrifugal element 4 radially inward (downward in FIGS. 7 and 8) through the cam surface 61, whereby the centrifugal element 4 is moved radially inward. As a result, the centrifugal element 4 is moved from a position shown in FIG. 7 to a position shown in FIG. 8. At this time, the centrifugal element 4 rolls on the second guide surface 212. The centrifugal element 4 rotates clockwise about the rotational axis thereof. It should be noted that the first rolling member 5 rotates counterclockwise about the rotational axis thereof in accordance with clockwise rotation of the centrifugal element 4 about the rotational axis thereof. Then, the first rolling member 5 is moved radially inward, while rolling on the first guide surface 211.

A centrifugal force is acting on the centrifugal element 4 moved to the position shown in FIG. 8 as described above. Hence, the centrifugal element 4 is moved radially outward (upward in FIG. 8). When described in detail, the centrifugal element 4 is moved radially outward, while rolling on the second guide surface 212. It should be noted that the centrifugal element 4 rotates counterclockwise about the rotational axis thereof. Thus, the first rolling member 5 rotates clockwise about the rotational axis thereof in accordance with counterclockwise rotation of the centrifugal element 4 about the rotational axis thereof. Then, the first rolling member 5 is moved radially outward, while rolling on the first guide surface 211.

Besides, the cam surface 61 provided on the centrifugal element 4 presses the pair of inertia rings 3 through the cam follower 62 to the right side in FIG. 8, whereby the pair of inertia rings 3 is moved to the right side in FIG. 8. At this time, the large diameter portion 621 of the cam follower 62 rolls on the cam surface 61, whereas the pair of small diameter portions 622 of the cam follower 62 rolls on the inner wall surfaces of each pair of second through holes 31 of the pair of inertia rings 3. It should be noted that the cam follower 62 rotates clockwise about the rotational axis thereof. As a result, the condition shown in FIG. 7 is restored.

It should be noted that when the rotational phase difference is reversely produced, the cam follower 62 is relatively moved along the cam surface 61 to the right side in FIG. 8. However, the actuation principle described above is also true of this case. At this time, the centrifugal element 4 rolls on the first guide surface 211 through the first rolling member 5.

As described above, when the rotational phase difference is produced between the hub flange 2 and the pair of inertia rings 3 by torque fluctuations, the hub flange 2 receives the circumferential force directed to reduce the rotational phase difference between the both by the centrifugal force acting on each centrifugal element 4 and the working of each cam mechanism 6. Torque fluctuations are inhibited by this force. It should be noted that a force is transmitted between each centrifugal element 4 and the pair of inertia rings 3 through each cam follower 62.

The force described above, by which torque fluctuations are inhibited, varies in accordance with the centrifugal force, in other words, the rotational speed of the hub flange 2 and varies as well in accordance with the rotational phase difference and the shape of the cam surface 61. Therefore, by suitably setting the shape of the cam surface 61, characteristics of the torque fluctuation inhibiting device 10 can be made optimal in accordance with the specification of the engine and so forth.

Besides, each centrifugal element 4 is radially moved while indirectly or directly rolling on the first or second guide surface 211, 212. Because of this, each centrifugal element 4 is radially movable in a smoother manner than that sliding on the first or second guide surface 211, 212. Moreover, each cam follower 62 rolls on the cam surface 61 and the inner wall surfaces of each pair of second through holes 31 of the pair of inertia rings 3. Because of this, a force can be transmitted between each centrifugal element 4 and the pair of inertia rings 3 in as smooth a manner as possible.

Exemplary Characteristics

Figure 9:
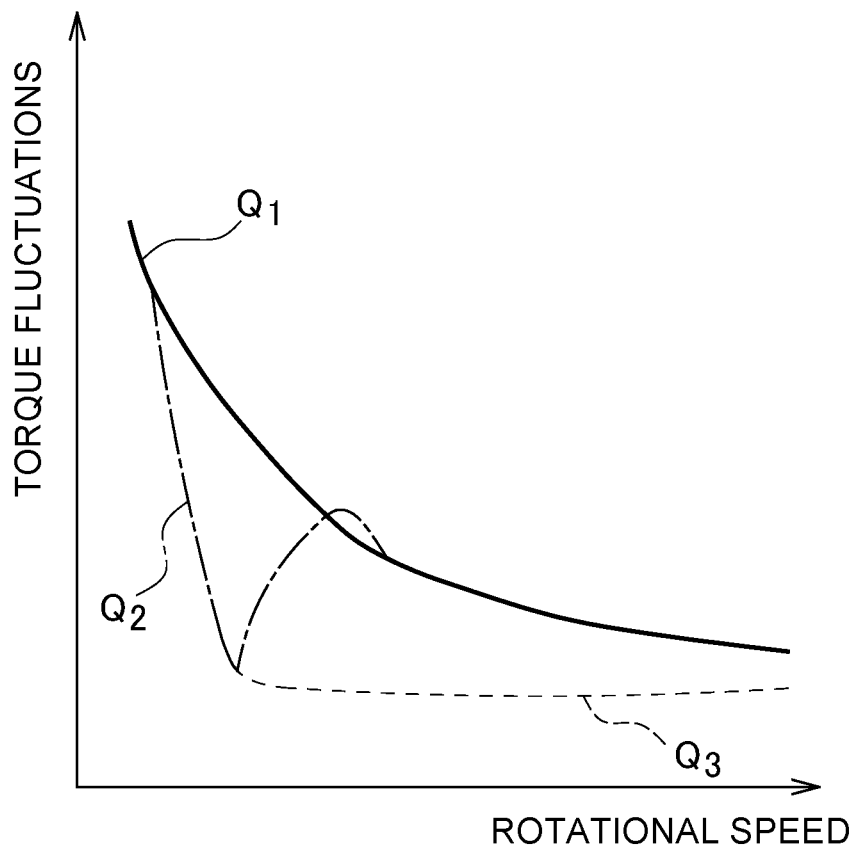
FIG. 9 is a chart showing exemplary characteristics of the torque fluctuation inhibiting device.

FIG. 9 is a chart showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present preferred embodiment.

As is obvious from FIG. 9, in an apparatus in which the well-known dynamic damper device without any cam mechanism is installed (characteristic Q2), torque fluctuations can be inhibited only in a specific rotational speed range. By contrast, in the condition with installation of the torque fluctuation inhibiting device 10 with the cam mechanisms 6 of the present preferred embodiment (characteristic Q3), torque fluctuations can be inhibited through the entire rotational speed ranges.

Modifications

The present invention is not limited to the preferred embodiment described above, and a variety of changes or modifications can be made without departing from the scope of the present invention.

Modification 1

Each centrifugal element 4 may not have a disc shape. For example, each centrifugal element 4, except for the first and second contact surfaces 42a and 42b, may not have a circular-arc shape as seen in a front view.

Modification 2

Each cam follower 62 can be attached to each pair of second through holes 31 of the pair of inertia rings 3 through a pair of bearing members.

Modification 3

Figure 10:
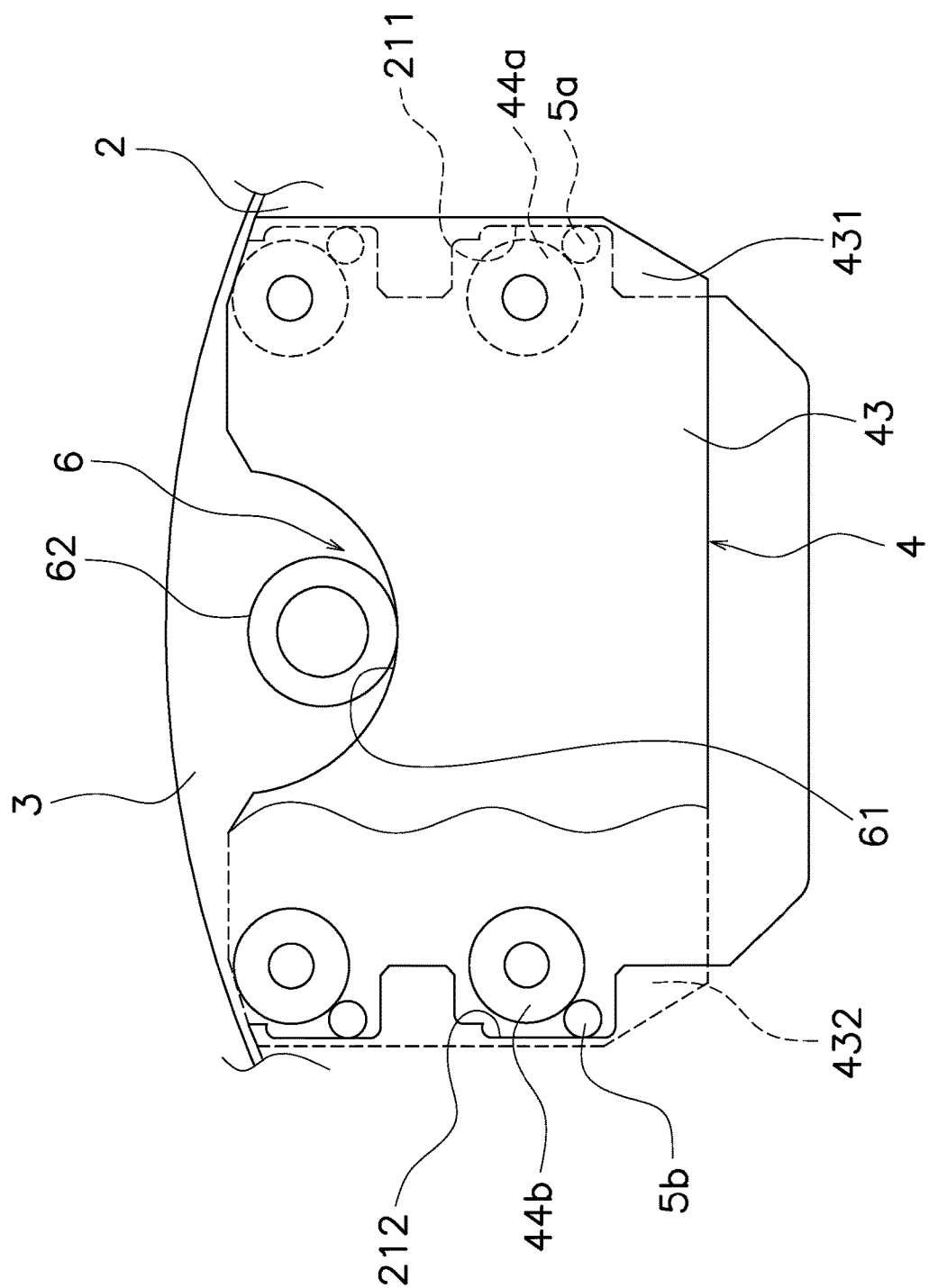
FIG. 10 is an enlarged view of a torque fluctuation inhibiting device according to a modification.

In the preferred embodiment described above, each centrifugal element 4 is configured to entirely rotate about the rotational axis thereof. However, the configuration of each centrifugal element 4 is not limited to the above. Alternatively, each centrifugal element 4 can be configured to rotate in part about the rotational axis thereof. For example, as shown in FIG. 10, each centrifugal element 4 includes a centrifugal element body 43, a plurality of first rotary parts 44a, and a plurality of second rotary parts 44b. It should be noted that in the present modification, the number of first rotary parts 44a and that of second rotary parts 44b are two, respectively.

The centrifugal element body 43 includes a first end portion 431 and a second end portion 432 in the circumferential direction. The first end portion 431 is disposed on the first guide surface 211 side, whereas the second end portion 432 is disposed on the second guide surface 212 side. The centrifugal element body 43 is composed of a pair of plates. The plural first rotary parts 44a and the plural second rotary parts 44b are axially interposed between the pair of plates. Preferably, the centrifugal element body 43 is not in contact with the hub flange 2.

The first rotary parts 44a are attached to be rotatable to the first end portion 431 of the centrifugal element body 43. In other words, each first rotary part 44a is configured to rotate about a rotational axis thereof. Each first rotary part 44a is disposed at an interval from the first guide surface 211.

The second rotary parts 44b are attached to be rotatable to the second end portion 432 of the centrifugal element body 43. In other words, each second rotary part 44b is configured to rotate about a rotational axis thereof. Each second rotary part 44b is disposed at an interval from the second guide surface 212.

First rolling members 5a are disposed between the first guide surface 211 and each centrifugal element 4. When described in detail, each first rolling member 5a is disposed between the first guide surface 211 and each first rotary part 44a. Each first rolling member 5a makes contact with the first guide surface 211 and each first rotary part 44a. The diameter of each first rolling member 5a is greater than the gap between each first rotary part 44a and the first guide surface 211.

Each first rolling member 5a rolls on the first guide surface 211 in accordance with rotation of each centrifugal element 4 about the rotational axis thereof. When described in detail, each first rolling member 5a rolls on the first guide surface 211 in accordance with rotation of each first rotary part 44a about the rotational axis thereof.

Second rolling members 5b are disposed between the second guide surface 212 and each centrifugal element 4. When described in detail, each second rolling member 5b is disposed between the second guide surface 212 and each second rotary part 44b. Each second rolling member 5b makes contact with the second guide surface 212 and each second rotary part 44b. The diameter of each second rolling member 5b is greater than the gap between each second rotary part 44b and the second guide surface 212.

Each second rolling member 5b rolls on the second guide surface 212 in accordance with rotation of each centrifugal element 4 about the rotational axis thereof. When described in detail, each second rolling member 5b rolls on the second guide surface 212 in accordance with rotation of each second rotary part 44b about the rotational axis thereof.

Modification 4

In the preferred embodiment described above, the hub flange 2 is provided with the centrifugal elements 4. Alternatively, the pair of inertia rings 3 can be provided with the centrifugal elements 4. In this case, the pair of inertia rings 3 corresponds to the first rotor of the present invention, whereas the hub flange 2 corresponds to the second rotor of the present invention.

Modification 5

In the preferred embodiment described above, the hub flange 2 has been exemplified as the first rotor. However, the first rotor is not limited to the above. For example, when a torque fluctuation inhibiting device is attached to a torque converter as configured in the present preferred embodiment, the front cover 11, the input-side rotor 131, or so forth can be set as the first rotor in the torque converter 100.

Modification 6

In the preferred embodiment described above, the torque fluctuation inhibiting device 10 is attached to the torque converter 100. Alternatively, the torque fluctuation inhibiting device 10 can be attached to another type of power transmission device such as a clutch device.

Figure 11:
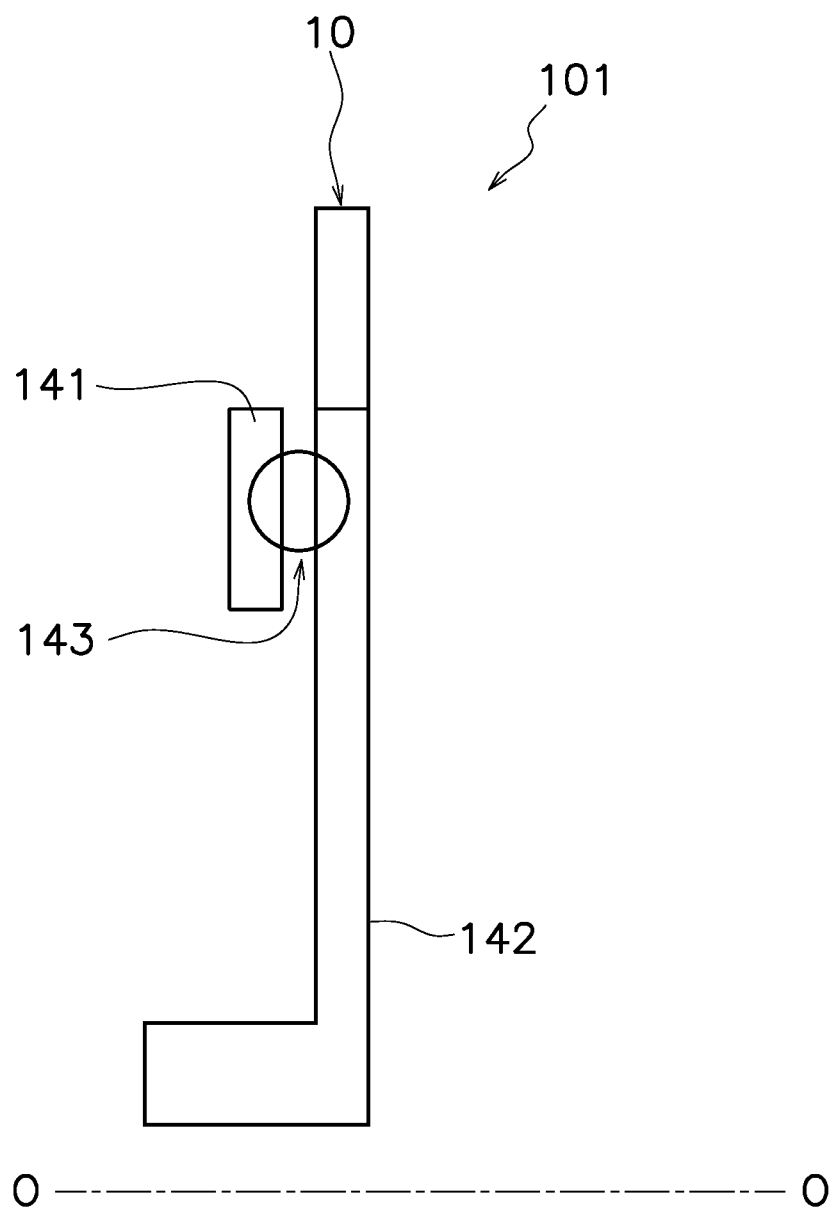
FIG. 11 is a schematic diagram of a damper device.

For example, as shown in FIG. 11, the torque fluctuation inhibiting device 10 can be attached to a damper device 101. The damper device 101 is installed in, for instance, a hybrid vehicle. The damper device 101 includes an input member 141, an output member 142, a damper 143, and the torque fluctuation inhibiting device 10. The input member 141 is a member to which a torque is inputted from a drive source. The damper 143 is disposed between the input member 141 and the output member 142. The output member 142 is a member to which the torque is transmitted from the input member 141 through the damper 143. The torque fluctuation inhibiting device 10 is attached to, for instance, the output member 142.

Modification 7

Figure 12:
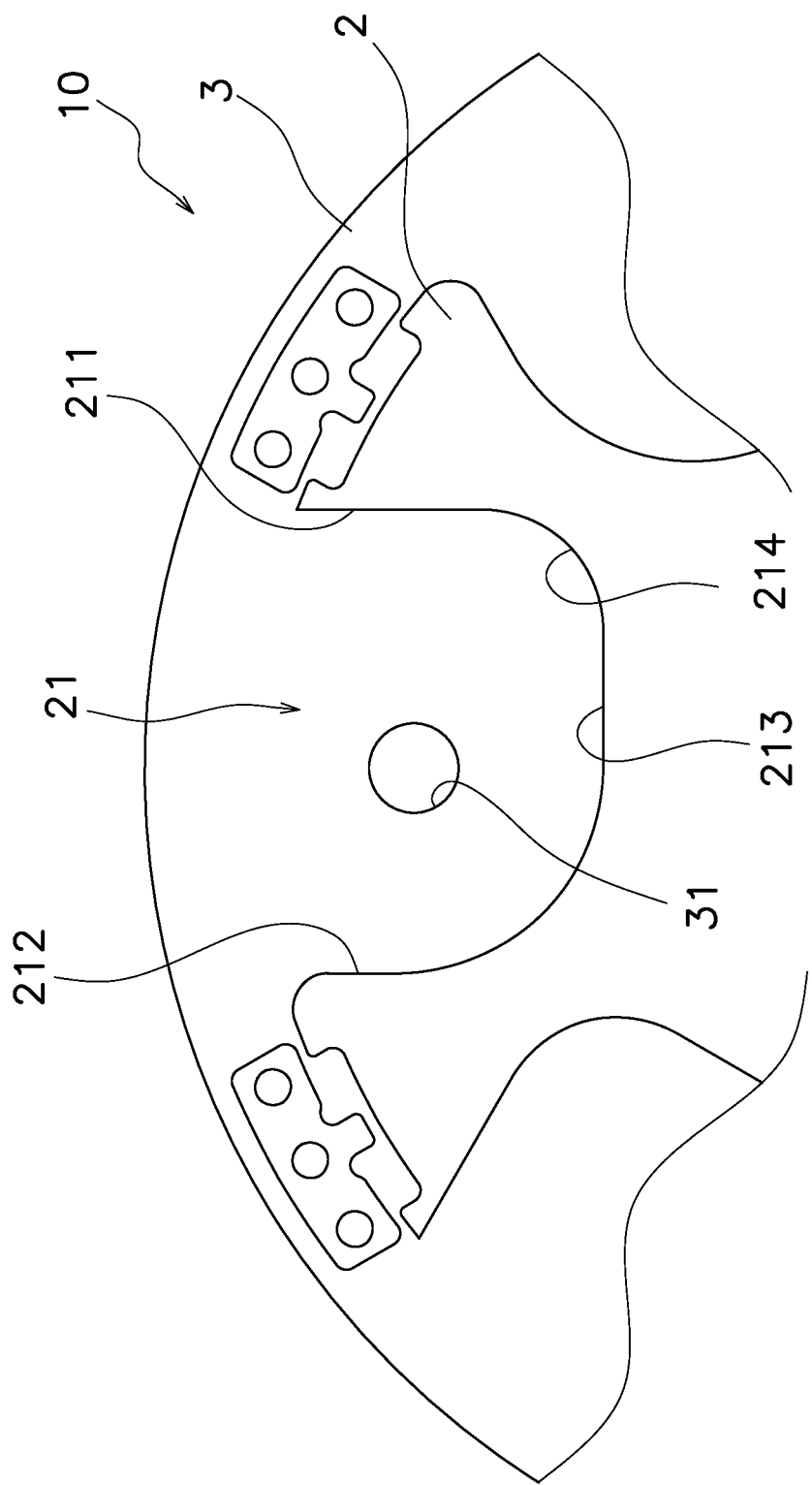
FIG. 12 is an enlarged front view of a torque fluctuation inhibiting device according to another modification.

FIG. 12 is an enlarged front view of the torque fluctuation inhibiting device 10 in a condition that one of the pair of inertia rings 3, the centrifugal elements 4, and the first rolling members 5 are detached therefrom. As shown in FIG. 12, each accommodation portion 21 includes the first guide surface 211, the second guide surface 212, the bottom surface 213, and a connecting surface 214.

Figure 13:
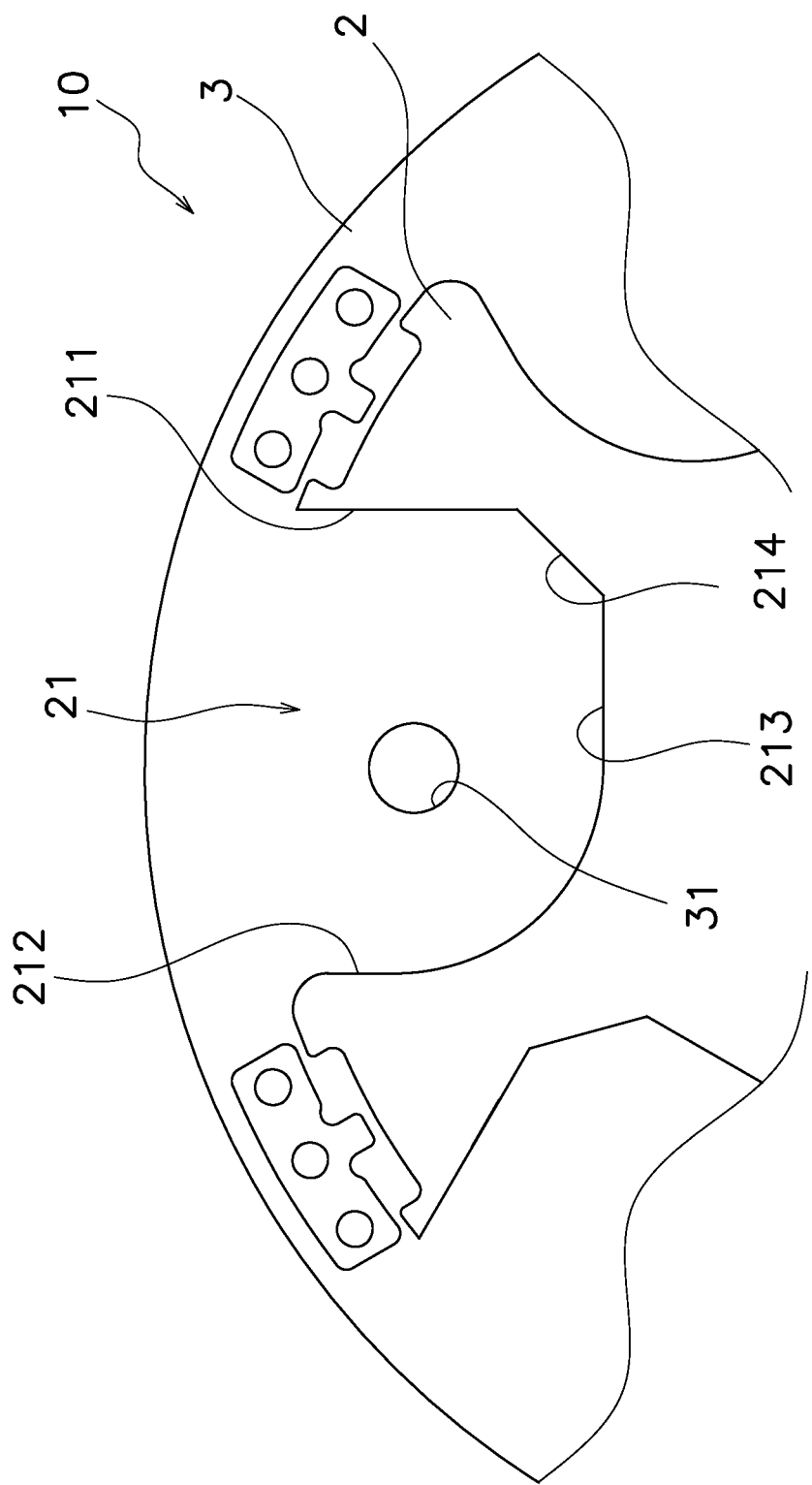
FIG. 13 is an enlarged front view of another torque fluctuation inhibiting device according to the another modification.

The connecting surface 214 connects the first guide surface 211 and the bottom surface 213 therethrough. The connecting surface 214 faces in both circumferential and radial directions. The connecting surface 214 is made in the shape of a curved surface. When described in detail, the connecting surface 214 is made in the shape of a recessed curved surface. As seen in the axial view, the connecting surface 214 has a circular-arc shape. Preferably, the connecting surface 214 is set to have a curvature radius greater than or equal to the radius of each first rolling member 5. It should be noted that as shown in FIG. 13, the connecting surface 214 can be made in the shape of a flat surface.

The connecting surface 214 is located radially inside each first rolling member 5. Hence, when each first rolling member 5 falls radially inward by the weight thereof, production of falling sound can be inhibited. It should be noted that in modification 7, the pair of inertia rings 3 is not provided with the restriction grooves 33.

Modification 8

Figure 14:
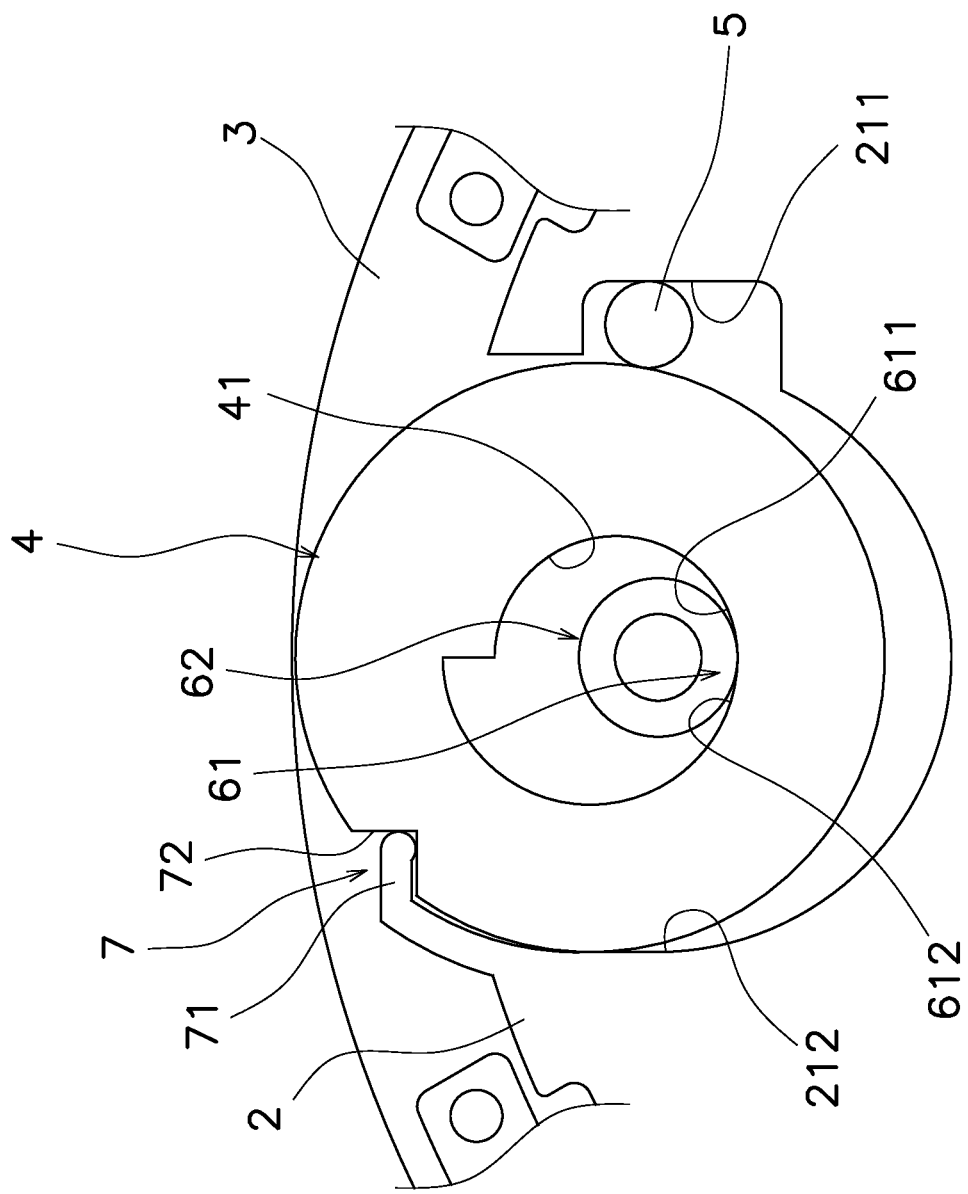
FIG. 14 is an enlarged front view of a torque fluctuation inhibiting device according to still another modification.

In the preferred embodiment described above, the first through hole 41 of each centrifugal element 4 is made in the shape of a true circle as seen in the axial view. However, the shape of the first through hole 41 is not limited to the above. As shown in FIG. 14, for instance, the first through hole 41 of each centrifugal element 4 may not be made in the shape of a true circle as seen in the axial view. This configuration will be hereinafter explained in detail.

As shown in FIG. 14, the cam surface 61 is provided as part of the inner wall surface of the first through hole 41. The cam surface 61 faces radially outward. In actuation of the torque fluctuation inhibiting device 10, each centrifugal element 4 is moved radially outward, whereby the cam surface 61 makes contact with each cam follower 62. When described in detail, the cam surface 61 makes contact with the large diameter portion 621 of each cam follower 62.

The cam surface 61 includes a first region 611 and a second region 612. The first region 611 is a region that makes contact with each cam follower 62 when each centrifugal element 4 rolls on the first guide surface 211 through each first rolling member 5. For example, when the pair of inertia rings 3 is rotated clockwise relative to the hub flange 2, the first region 611 makes contact with each cam follower 62. In other words, the first region 611 is a region ranging from the radially innermost part of the cam surface 61 to the first guide surface 211 side (right side in FIG. 14).

The second region 612 is a region that makes contact with each cam follower 62 when each centrifugal element 4 rolls on the second guide surface 212. For example, when the pair of inertia rings 3 is rotated counterclockwise relative to the hub flange 2, the second region 612 makes contact with each cam follower 62. In other words, the second region 612 is a region ranging from the radially innermost part of the cam surface 61 to the second guide surface 212 side (left side in FIG. 14).

The first region 611 is different in curved surface shape from the second region 612. Each of the first and second regions 611 and 612 has a circular-arc shape as seen in the axial view. In the present modification, the first region 611 is less in curvature radius than the second region 612.

It should be noted that in the present modification, as seen in the axial view, the right half of the first through hole 41 has a semicircular shape; likewise, the left half of the first through hole 41 has a semicircular shape. As seen in the axial view, the semicircle forming the right half of the first through hole 41 is less in radius than that forming the left half of the first through hole 41. In other words, as seen in the axial view, the first through hole 41 is composed of two semicircles different in radius from each other.

A boundary between the first region 611 and the second region 612 is the radially innermost part of the cam surface 61. The boundary between the first region 611 and the second region 612 makes contact with each cam follower 62 when the hub flange 2 and the pair of inertia rings 3 are unitarily rotated without being rotated relative to each other, i.e., when the rotational phase difference θ between the hub flange 2 and the pair of inertia rings 3 is zero.

It should be noted that when the boundary between the first region 611 and the second region 612 makes contact with each cam follower 62 as described above, each centrifugal element 4 is in a state referred to as "neutral state". Conversely, when each centrifugal element 4 is in the neutral state, the boundary between the first region 611 and the second region 612 makes contact with each cam follower 62.

Figure 15:
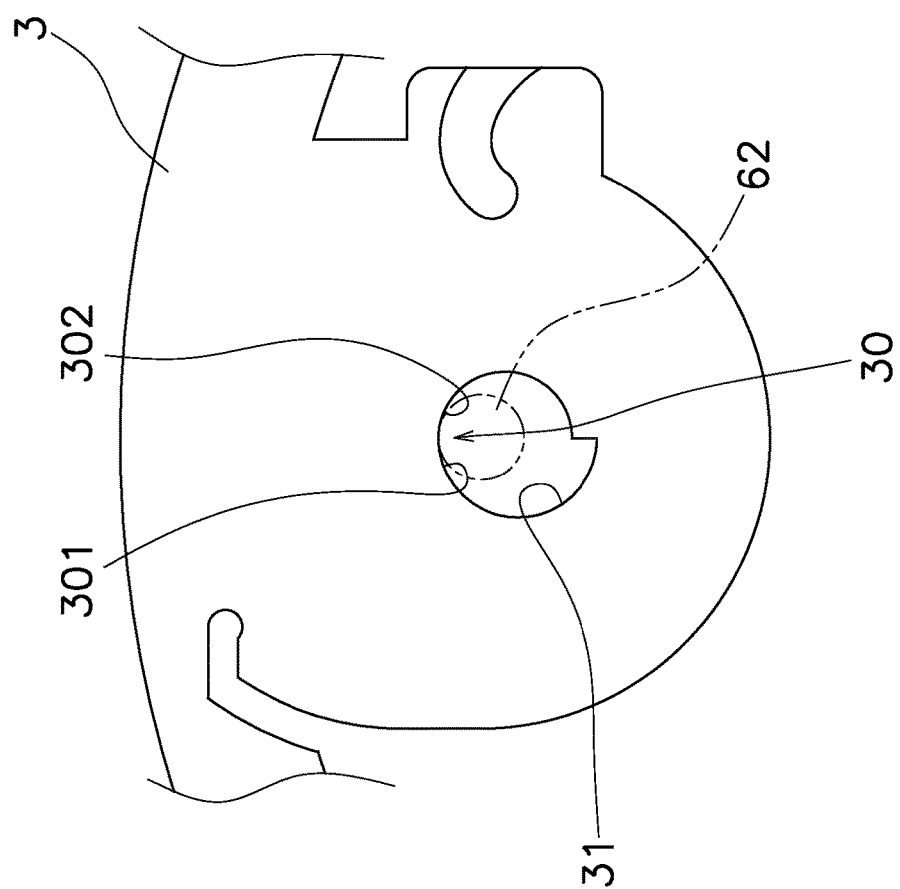
FIG. 15 is an enlarged front view of the torque fluctuation inhibiting device according to the still another modification.

FIG. 15 is a front view of the torque fluctuation inhibiting device in a condition that each centrifugal element 4, each first rolling member 5, and each cam follower 62 are detached therefrom. As shown in FIG. 15, each second through hole 31 can be made in a shape other than a true circle as seen in the axial view.

A contact surface 30 is provided as part of the inner wall surface of each second through hole 31. The contact surface 30 faces radially inward. The contact surface 30 makes contact with each cam follower 62. It should be noted that the contact surface 30 makes contact with each cam follower 62 in actuation and stop of the torque fluctuation inhibiting device 10. When described in detail, the contact surface 30 makes contact with each small diameter portion 622 of each cam follower 62.

The contact surface 30 includes a third region 301 and a fourth region 302. The third region 301 is a region that makes contact with each cam follower 62 when each centrifugal element 4 rolls on the first guide surface 211 through each first rolling member 5. For example, when the pair of inertia rings 3 is rotated clockwise relative to the hub flange 2, the third region 301 makes contact with each cam follower 62. In other words, the third region 301 is a region ranging from a radially outermost part of the contact surface 30 to the second guide surface 212 side (left side in FIG. 15).

The fourth region 302 is a region that makes contact with each cam follower 62 when each centrifugal element 4 rolls on the second guide surface 212. For example, when the pair of inertia rings 3 is rotated counterclockwise relative to the hub flange 2, the fourth region 302 makes contact with each cam follower 62. In other words, the fourth region 302 is a region ranging from the radially outermost part of the contact surface 30 to the first guide surface 211 side (right side in FIG. 15).

The third region 301 is different in curved surface shape from the fourth region 302. Each of the third and fourth regions 301 and 302 has a circular-arc shape as seen in the axial view. In the present modification, the third region 301 is greater in curvature radius than the fourth region 302.

It should be noted that in the present modification, as seen in the axial view, the right half of each second through hole 31 has a semicircular shape; likewise, the left half of each second through hole 31 has a semicircular shape. As seen in the axial view, the semicircle forming the right half of each second through hole 31 is less in radius than that forming the left half of each second through hole 31. In other words, as seen in the axial view, each second through hole 31 is composed of two semicircles different in radius from each other.

A boundary between the third region 301 and the fourth region 302 is the radially outermost part of the contact surface 30. When in the neutral state, each centrifugal element 4 makes contact with the boundary between the third region 301 and the fourth region 302.

As shown in FIG. 14, the torque fluctuation inhibiting device 10 includes state maintaining mechanisms 7. When the hub flange 2 and the pair of inertia rings 3 are unitarily rotated, i.e., when the rotational phase difference θ is zero, each state maintaining mechanism 7 is configured to maintain the neutral state of each centrifugal element 4. Because of this, when the rotational phase difference θ is zero, the boundary between the first region 611 and the second region 612 makes contact with each cam follower 62.

Each state maintaining mechanism 7 includes a first engaging portion 71 and a second engaging portion 72. The first engaging portion 71 is provided on the hub flange 2. The first engaging portion 71 protrudes from the hub flange 2 toward each centrifugal element 4.

The second engaging portion 72 is provided on each centrifugal element 4. The second engaging portion 72 is a recess provided on each centrifugal element 4. The second engaging portion 72 is engaged with the first engaging portion 71. When described in detail, the first engaging portion 71 is disposed within the second engaging portion 72. Because of this, the first and second engaging portions 71 and 72 make contact with each other. As a result, when the hub flange 2 and the pair of inertia rings 3 are not rotated relative to each other, each centrifugal element 4 is restricted from rotating about the rotational axis thereof.

Figure 16:
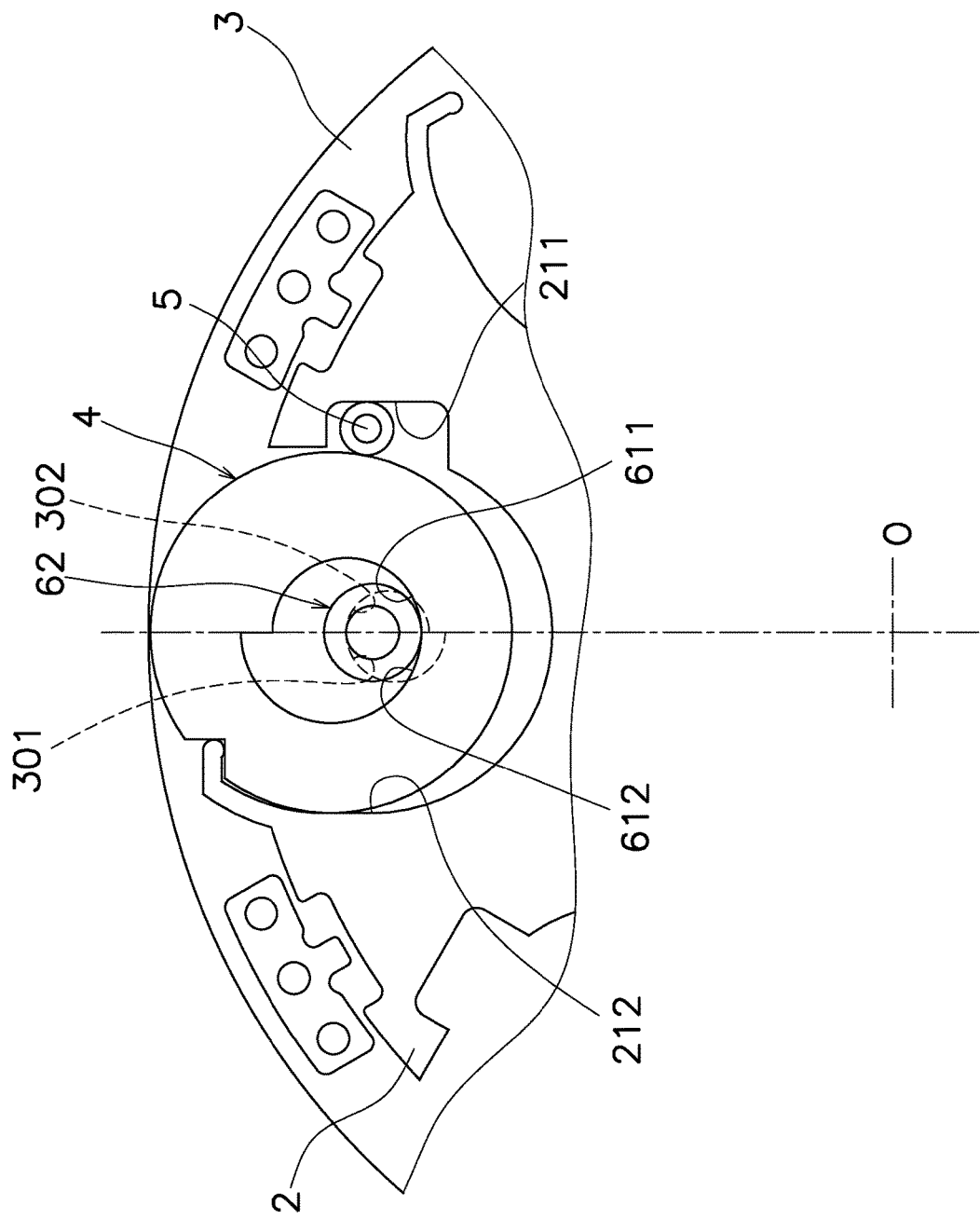
FIG. 16 is an enlarged front view of the torque fluctuation inhibiting device according to the still another modification.

Next, the action of the torque fluctuation inhibiting device 10 will be explained. First, as shown in FIG. 16, when the hub flange 2 and the pair of inertia rings 3 are not rotated relative to each other, i.e., when the rotational phase difference θ is zero, each centrifugal element 4 is in the neutral state. Because of this, each cam follower 62 makes contact with the boundary between the first region 611 and the second region 612. Besides, each cam follower 62 makes contact with the boundary between the third region 301 and the fourth region 302. Each centrifugal element 4 is not in rotation about the rotational axis thereof.

Figure 17:
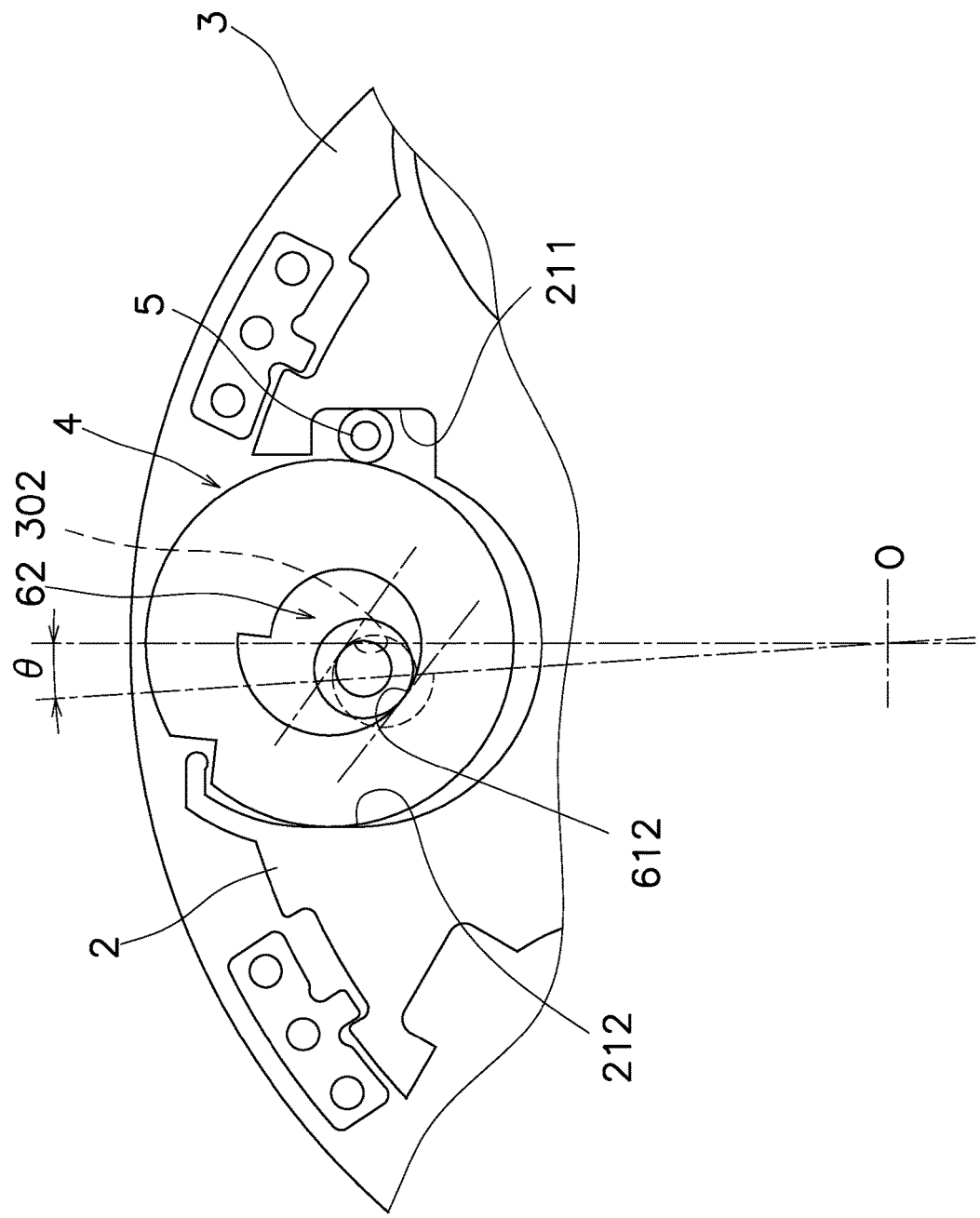
FIG. 17 is an enlarged front view of the torque fluctuation inhibiting device according to the still another modification.

As shown in FIG. 17, when the pair of inertia rings 3 is rotated counterclockwise relative to the hub flange 2, each centrifugal element 4 rolls on the second guide surface 212. It should be noted that each centrifugal element 4 rolls clockwise.

Each cam follower 62 rolls on the cam surface 61, specifically, on the second region 612. Besides, each cam follower 62 rolls on the contact surface 30, specifically, on the fourth region 302. Thus, each cam follower 62 is sandwiched between the second region 612 and the fourth region 302. It should be noted that each cam follower 62 rolls counterclockwise.

Figure 18:
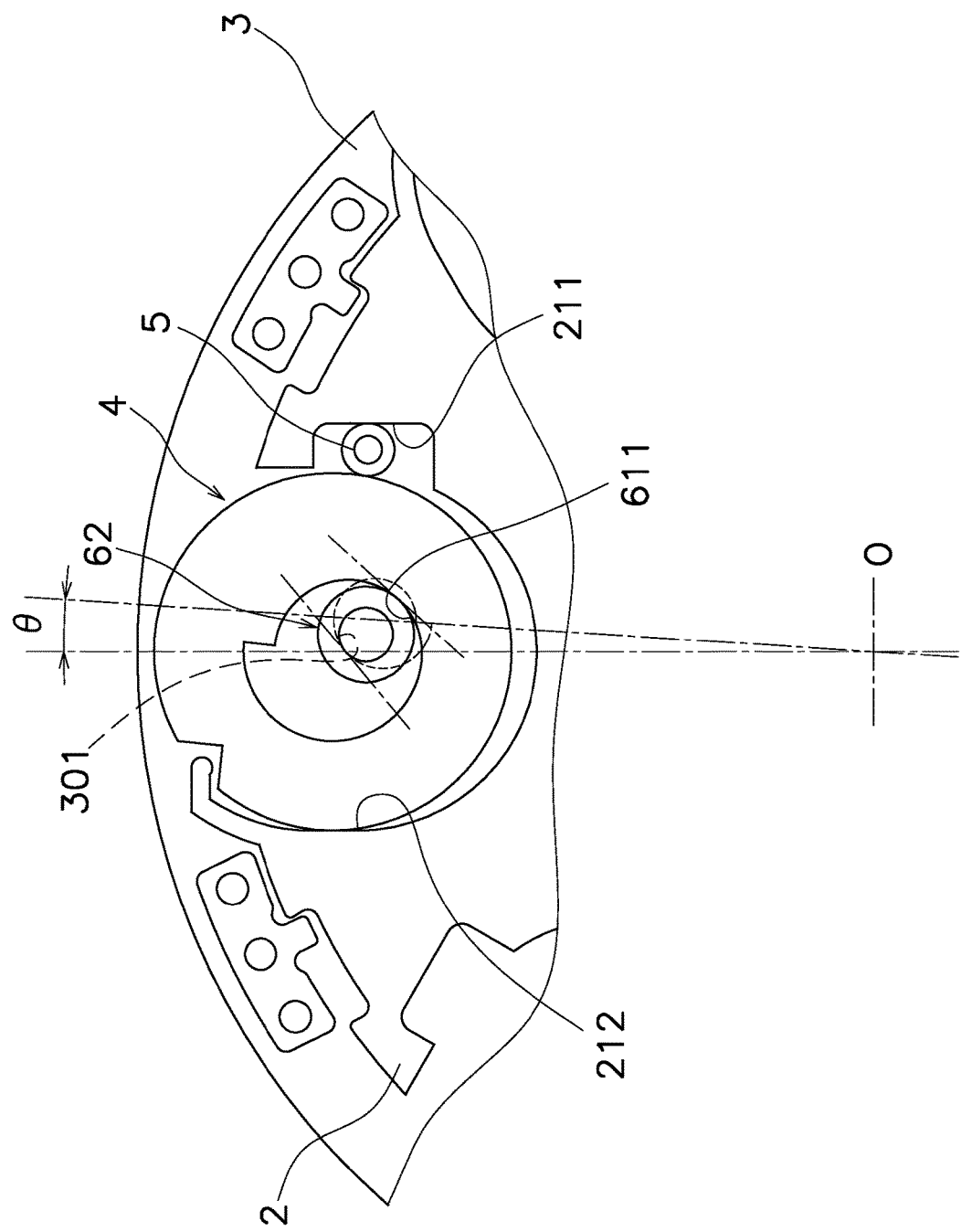
FIG. 18 is an enlarged front view of the torque fluctuation inhibiting device according to the still another modification.

As shown in FIG. 18, when the pair of inertia rings 3 is rotated clockwise relative to the hub flange 2, each centrifugal element 4 rolls on the first guide surface 211 through each first rolling member 5. It should be noted that each centrifugal element 4 rolls clockwise.

Each cam follower 62 rolls on the cam surface 61, specifically, on the first region 611. Besides, each cam follower 62 rolls on the contact surface 30, specifically, on the third region 301. Thus, each cam follower 62 is sandwiched between the first region 611 and the third region 301. It should be noted that each cam follower 62 rolls clockwise.

Each centrifugal element 4 herein rolls not directly on the first guide surface 211 but indirectly on the first guide surface 211 through the first rolling members 5. Because of this, when the first region 611 is set to be equal in curvature radius to the second region 612, it is concerned that an angle formed between a first imaginary tangent and a second imaginary tangent undesirably deviates from an appropriate angular range. As a result, occurrence of the following drawback is concerned: Each cam follower 62 cannot be firmly sandwiched between the contact surface 30 and the cam surface 61. It should be noted that the term "first imaginary tangent" means an imaginary tangent drawn at a contact point between each cam follower 62 and the cam surface 61, whereas the term "second imaginary tangent" means an imaginary tangent drawn at a contact point between each cam follower 62 and the contact surface 30.

By contrast to the setting, in the present modification, the first region 611 is different in curvature radius from the second region 612; specifically, the first region 611 is set to be less in curvature radius than the second region 612. Hence, the angle formed between the first tangent and the second tangent falls within the appropriate angular range, whereby each cam follower 62 can be firmly sandwiched between and the cam surface 61 and the contact surface 30.

Moreover, in the present modification, the third region 301 is different in curvature radius from the fourth region 302; specifically, the third region 301 is set to be greater in curvature radius than the fourth region 302. Hence, the angle formed between the first tangent and the second tangent falls within the appropriate angular range, whereby each cam follower 62 can be firmly sandwiched between the cam surface 61 and the contact surface 30.

Figure 19:
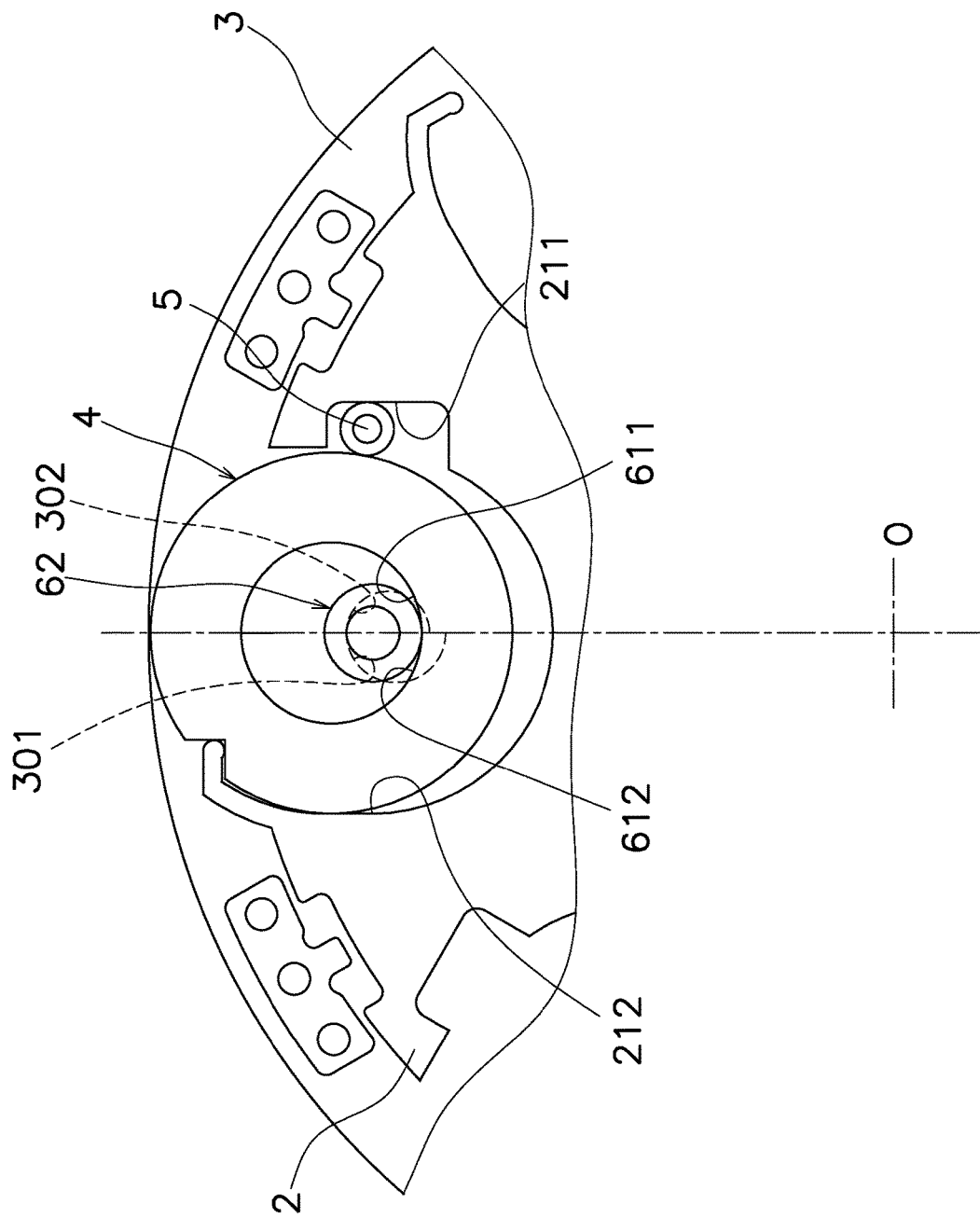
FIG. 19 is an enlarged front view of another torque fluctuation inhibiting device according to the still another modification.
Figure 20:
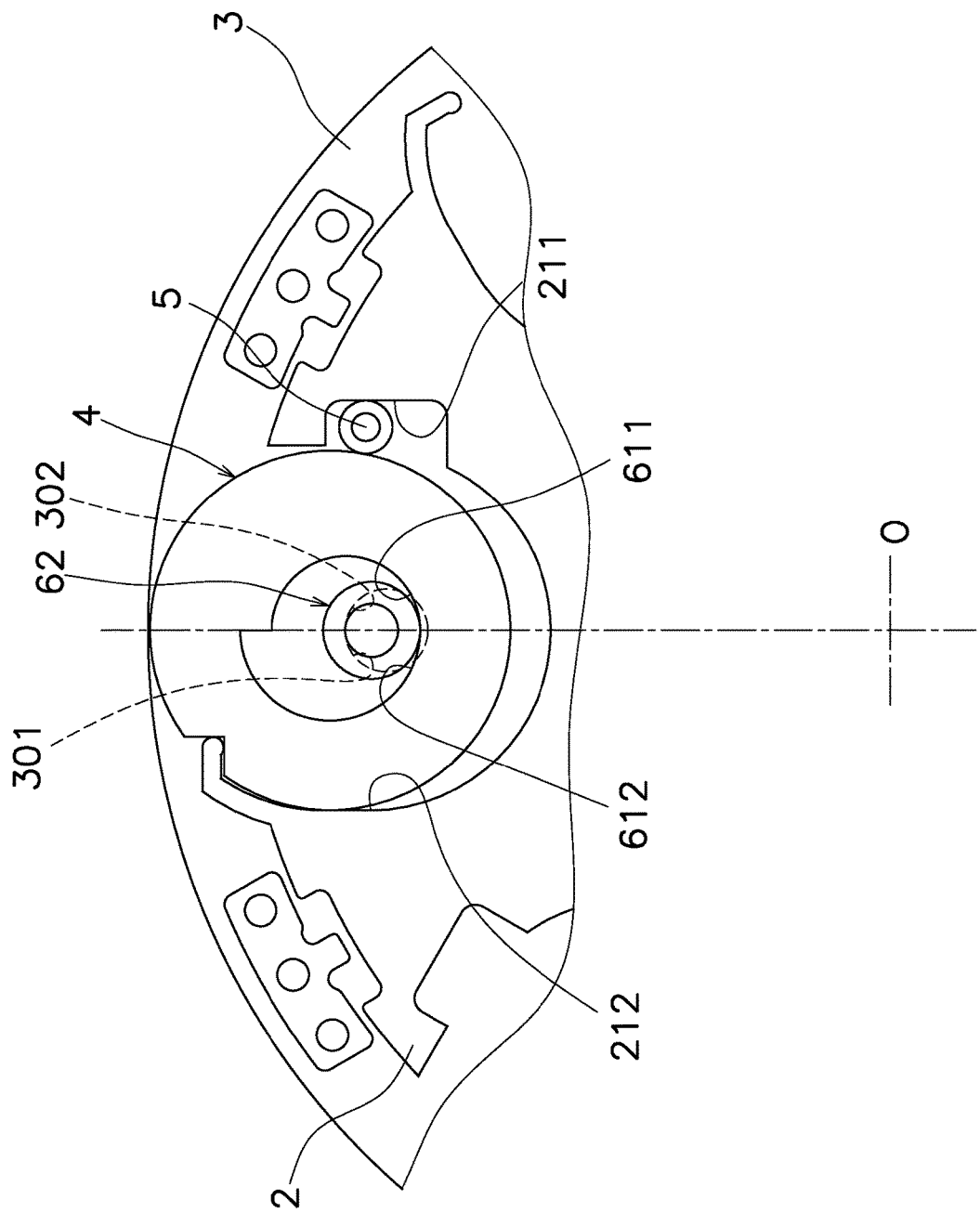
FIG. 20 is an enlarged front view of still another torque fluctuation inhibiting device according to the still another modification.

It should be noted that as shown in FIG. 19, the third and fourth regions 301 and 302 can be different in curved surface shape from each other, whereas the first and second regions 611 and 612 can be identical in curved surface shape to each other. Alternatively, as shown in FIG. 20, the first and second regions 611 and 612 can be different in curved surface shape from each other, whereas the third and fourth regions 301 and 302 can be identical in curved surface shape to each other.

REFERENCE SIGNS LIST

10 Torque fluctuation inhibiting device
100 Torque converter
2 Hub flange
21 Accommodation portion
211 First guide surface
212 Second guide surface
213 Bottom surface
214 Connecting surface
3 Inertia ring
31 Second through hole
33 Restriction groove
4 Centrifugal element
41 First through hole
43 Centrifugal element body
44a First rotary part
44b Second rotary part
5 First rolling member
5a First rolling member
5b Second rolling member
6 Cam mechanism
61 Cam surface
62 Cam follower

What is claimed is:

1. A rotary device comprising:
   a first rotor disposed to be rotatable, the first rotor including an accommodation portion having a first guide surface and a second guide surface, the first and second guide surfaces facing both sides in a circumferential direction;
   a second rotor disposed to be rotatable with the first rotor and be rotatable relative to the first rotor;
   a centrifugal element disposed within the accommodation portion, the centrifugal element disposed to be radially movable by a centrifugal force acting thereon in rotation of the first or second rotor, the centrifugal element configured to rotate about a rotational axis thereof in radial movement thereof; and
   a first rolling member disposed between the first guide surface and the centrifugal element, the first rolling member configured to roll on the first guide surface in accordance with rotation of the centrifugal element about the rotational axis thereof,
   wherein the second rotor includes a restriction groove and the first rolling member is supported by the restriction groove.

2. The rotary device according to claim 1, wherein the centrifugal element is configured to roll on the second guide surface.

3. The rotary device according to claim 2, wherein the centrifugal element and the first rolling member are each made in shape of a hollow or solid cylinder, and
   a distance between the first guide surface and the second guide surface is less than a sum of a diameter of the centrifugal element and a diameter of the first rolling member.

4. The rotary device according to claim 2, further comprising:
   a cam follower made in shape of a solid or hollow cylinder, wherein
   the centrifugal element includes a first through hole axially extending,
   the second rotor includes a second through hole axially extending,
   the first through hole includes a cam surface provided as part of an inner wall surface thereof, the cam surface facing radially outward, the cam surface configured to contact the cam follower,
   the second through hole includes a contact surface provided as part of an inner wall surface thereof, the contact surface facing radially inward, the contact surface configured to contact the cam follower,
   the contact surface includes a third region and a fourth region, the third region configured to contact the cam follower when the centrifugal element rolls on the first guide surface through the first rolling member, the fourth region configured to contact the cam follower when the centrifugal element rolls on the second guide surface, and
   the third region is different in curved surface shape from the fourth region.

5. The rotary device according to claim 1, further comprising:
   a second rolling member disposed between the second guide surface and the centrifugal element, the second rolling member configured to roll on the second guide surface in accordance with the rotation of the centrifugal element about the rotational axis thereof.

6. The rotary device according to claim 1, further comprising:
   a cam mechanism configured to receive the centrifugal force acting on the centrifugal element, the cam mechanism further configured to convert the centrifugal force into a circumferential force directed to reduce rotational phase difference between the first rotor and the second rotor,
   wherein the cam mechanism includes a cam surface provided on the centrifugal element, and a cam follower configured to contact the cam surface, the cam follower further configured to transmit a force therethrough between the centrifugal element and the second rotor.

7. The rotary device according to claim 6, wherein the cam follower is further configured to roll on the cam surface.

8. The rotary device according to claim 6, wherein
   the centrifugal element includes a first through hole axially penetrating therethrough, and
   the cam surface is provided as part of an inner wall surface of the first through hole.

9. The rotary device according to claim 6, wherein the cam follower is attached to the second rotor in a state of being rotatable about a rotational axis thereof.

10. The rotary device according to claim 6, wherein the second rotor includes a second through hole, and the cam follower is configured to roll on an inner wall surface of the second through hole.

11. The rotary device according to claim 6, wherein the cam follower is a roller made in shape of a solid or hollow cylinder.

12. The rotary device according to claim 1, wherein the accommodation portion includes
    a bottom surface facing radially outward, and
    a connecting surface connecting the first guide surface and the bottom surface therethrough.

13. The rotary device according to claim 12, wherein the connecting surface is made in shape of a curved surface.

14. The rotary device according to claim 12, wherein the connecting surface is made in shape of a flat surface.

15. A power transmission device comprising:
    an input member;
    an output member to which a torque is transmitted from the input member; and
    the rotary device recited in claim 1, the rotary device being operationally disposed between the input member and the output member to transmit torque therethrough.

16. A rotary device comprising:
    a first rotor disposed to be rotatable, the first rotor including an accommodation portion having a first guide surface and a second guide surface, the first and second guide surfaces facing both sides in a circumferential direction;
    a second rotor disposed to be rotatable with the first rotor and be rotatable relative to the first rotor;
    a centrifugal element disposed within the accommodation portion, the centrifugal element disposed to be radially movable by a centrifugal force acting thereon in rotation of the first or second rotor;
    a first rolling member disposed between the first guide surface and the centrifugal element, the first rolling member configured to roll on the first guide surface in accordance with rotation of the centrifugal element about the rotational axis thereof; and
    a second rolling member disposed between the second guide surface and the centrifugal element, the second rolling member configured to roll on the second guide surface in accordance with the rotation of the centrifugal element about the rotational axis thereof, wherein the centrifugal element includes a centrifugal element body including a first end portion and a second end portion in the circumferential direction, a first rotary part attached to be rotatable to the first end portion of the centrifugal element body, and a second rotary part attached to be rotatable to the second end portion of the centrifugal element body, the first rolling member is disposed between the first guide surface and the first rotary part, the first rolling member configured to roll on the first guide surface in accordance with rotation of the first rotary part about a rotational axis thereof, and the second rolling member is disposed between the second guide surface and the second rotary part, the second rolling member configured to roll on the second guide surface in accordance with rotation of the second rotary part about a rotational axis thereof.

17. A rotary device comprising:

a first rotor disposed to be rotatable, the first rotor including an accommodation portion having a first guide surface and a second guide surface, the first and second guide surfaces facing both sides in a circumferential direction;

a second rotor disposed to be rotatable with the first rotor and be rotatable relative to the first rotor;

a centrifugal element disposed within the accommodation portion, the centrifugal element disposed to be radially movable by a centrifugal force acting thereon in rotation of the first or second rotor, the centrifugal element configured to rotate about a rotational axis thereof in radial movement thereof and to roll on the second guide surface;

a first rolling member disposed between the first guide surface and the centrifugal element, the first rolling member configured to roll on the first guide surface in accordance with rotation of the centrifugal element about the rotational axis thereof, and a cam follower made in shape of a solid or hollow cylinder, wherein the centrifugal element includes a first through hole axially extending, the second rotor includes a second through hole axially extending, the first through hole includes a cam surface provided as part of an inner wall surface thereof, the cam surface facing radially outward, the cam surface configured to contact the cam follower, the second through hole includes a contact surface provided as part of an inner wall surface thereof, the contact surface facing radially inward, the contact surface configured to contact the cam follower, the cam surface includes a first region and a second region, the first region configured to contact the cam follower when the centrifugal element rolls on the first guide surface through the first rolling member, the second region configured to contact the cam follower when the centrifugal element rolls on the second guide surface, and the first region is different in curved surface shape from the second region.

18. The rotary device according to claim 17, wherein the first region is less in curvature radius than the second region.

19. The rotary device according to claim 17, wherein the contact surface includes a third region and a fourth region, the third region configured to contact the cam follower when the centrifugal element rolls on the first guide surface through the first rolling member, the fourth region configured to contact the cam follower when the centrifugal element rolls on the second guide surface, and the third region is different in curved surface shape from the fourth region.

20. The rotary device according to claim 19, wherein the third region is greater in curvature radius than the fourth region.

21. The rotary device according to claim 17, further comprising:

a state maintaining mechanism configured to maintain a state of the centrifugal element such that a boundary between the first region and the second region contacts the cam follower when the first rotor and the second rotor are unitarily rotated with each other without being rotated relative to each other.

22. The rotary device according to claim 21, wherein the state maintaining mechanism includes a first engaging portion and a second engaging portion, the first engaging portion provided on the first rotor, the second engaging portion provided on the centrifugal element to be engaged with the first engaging portion.

* * * * *